United States Patent
Brugarolas Brufau et al.

(10) Patent No.: US 12,236,003 B2
(45) Date of Patent: Feb. 25, 2025

(54) METHOD AND SYSTEM OF INTERACTIVE STORYTELLING WITH PROBABILITY-BASED PERSONALIZED VIEWS

(71) Applicant: Intel Corporation, Santa Clara, CA (US)

(72) Inventors: Rita Brugarolas Brufau, Hillsboro, OR (US); David Israel Gonzalez Aguirre, Hillsboro, OR (US); Philip Krejov, Marina Del Rey, CA (US)

(73) Assignee: Intel Corporation, Santa Clara, CA (US)

( * ) Notice: Subject to any disclaimer, the term of this patent is extended or adjusted under 35 U.S.C. 154(b) by 868 days.

(21) Appl. No.: 17/172,878

(22) Filed: Feb. 10, 2021

(65) Prior Publication Data

US 2021/0165481 A1 Jun. 3, 2021

(51) Int. Cl.
*G06F 3/01* (2006.01)
*G06N 7/01* (2023.01)
*G06N 20/00* (2019.01)
*G06T 15/00* (2011.01)

(52) U.S. Cl.
CPC .............. *G06F 3/011* (2013.01); *G06N 7/01* (2023.01); *G06N 20/00* (2019.01); *G06T 15/00* (2013.01)

(58) Field of Classification Search
None
See application file for complete search history.

(56) References Cited

U.S. PATENT DOCUMENTS

2019/0273972 A1* 9/2019 Soderbergh ...... H04N 21/23424

OTHER PUBLICATIONS

"HIVE: Hypermedia Interactive Virtual Environment", https://www.diva-portal.org/smash/get/diva2:473293/FULLTEXT01.pdf.
Gad, J. "Branching Narratives: Black Mirror: Bandersnatch", NYC Design; Medium; https://medium.com/nyc-design/branching-narratives-black-mirror-bandersnatch-ed1b5dfde941, 2020.
Steam, "The Stanley Parable on Steam", https://store.steampowered.com/app/221910/The_Stanley_Parable, 2020.
Wikipedia, "Interactive storytelling", retrieved online via https://en.wikipedia.org/wiki/Interactive_storytelling.
Wikipedia, "Nonlinear narrative", retrieved online via https://en.wikipedia.org/wiki/Nonlinear_narrative.
Wikipedia, "Volume rendering", retrieved online via https://en.wikipedia.org/wiki/Volume_rendering.

* cited by examiner

*Primary Examiner* — Nurun Flora
(74) *Attorney, Agent, or Firm* — Hanley, Flight & Zimmerman, LLC

(57) ABSTRACT

A system, article, and method of interactive storytelling generates probability-based personalized views factoring observable user behaviors.

21 Claims, 11 Drawing Sheets

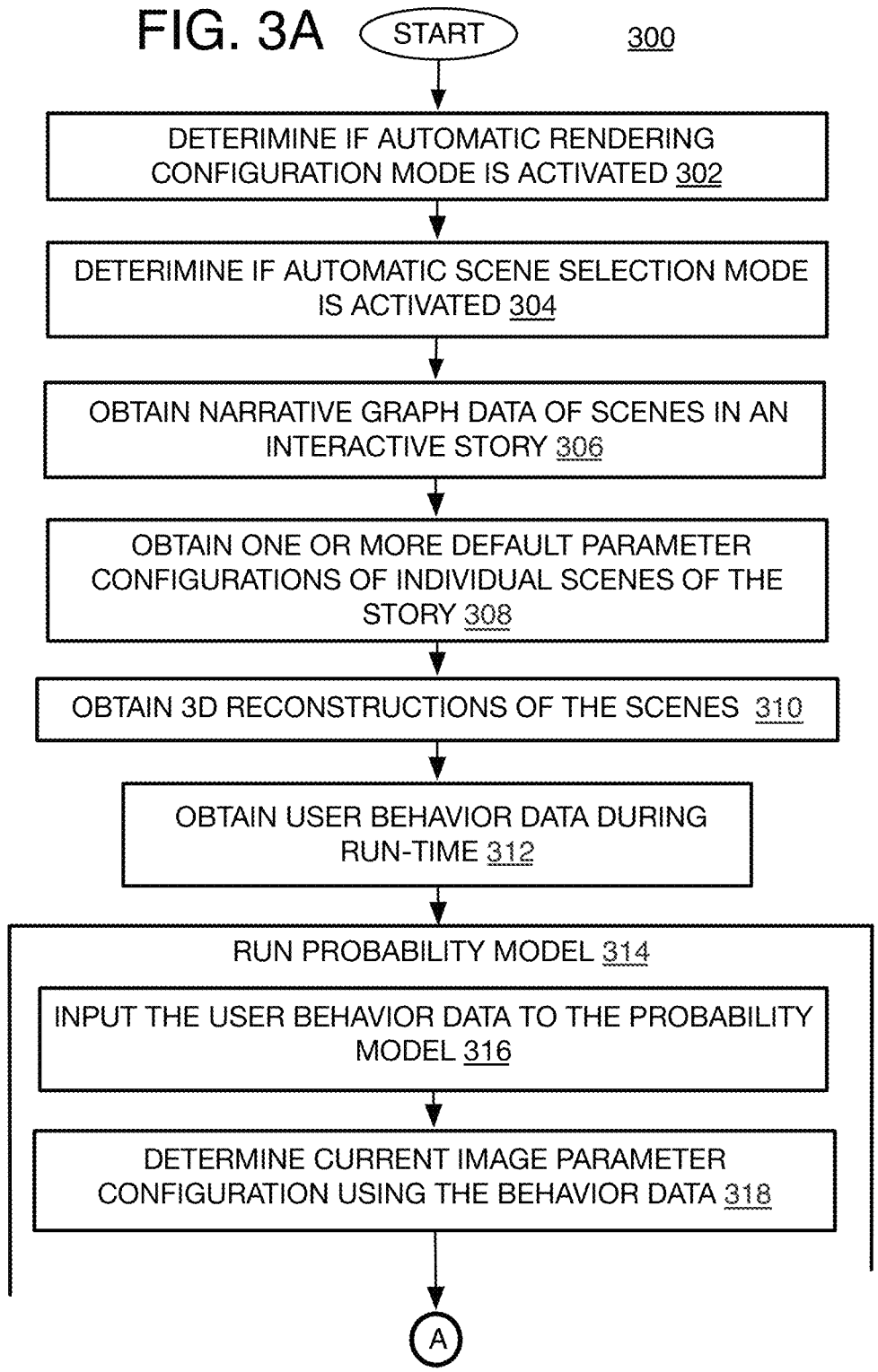

METHOD AND SYSTEM OF INTERACTIVE STORYTELLING WITH PROBABILITY-BASED PERSONALIZED VIEWS

BACKGROUND

Interactive storytelling is a form of digital entertainment in which the storyline is not predetermined, and a user experiences a unique story based on their interactions with the story world. Typically, a user selects among a number of optional scenes in the storyline, often by pressing buttons on a remote control. This disruptive act to select among optional scenes, however, can often reduce the quality of the immersion (or "immersiveness" experience) of the storytelling. The conventional story telling systems also provide relatively limited variations in the look and feel of the scene from person to person using the system. This results in a very generic controlled environment that reduces the immersive quality of the experience.

DESCRIPTION OF THE FIGURES

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIGS. 3A-3C is a detailed flow chart of a method of image processing for interactive storytelling according to at least one of the implementations herein;

DETAILED DESCRIPTION

Figure 1:
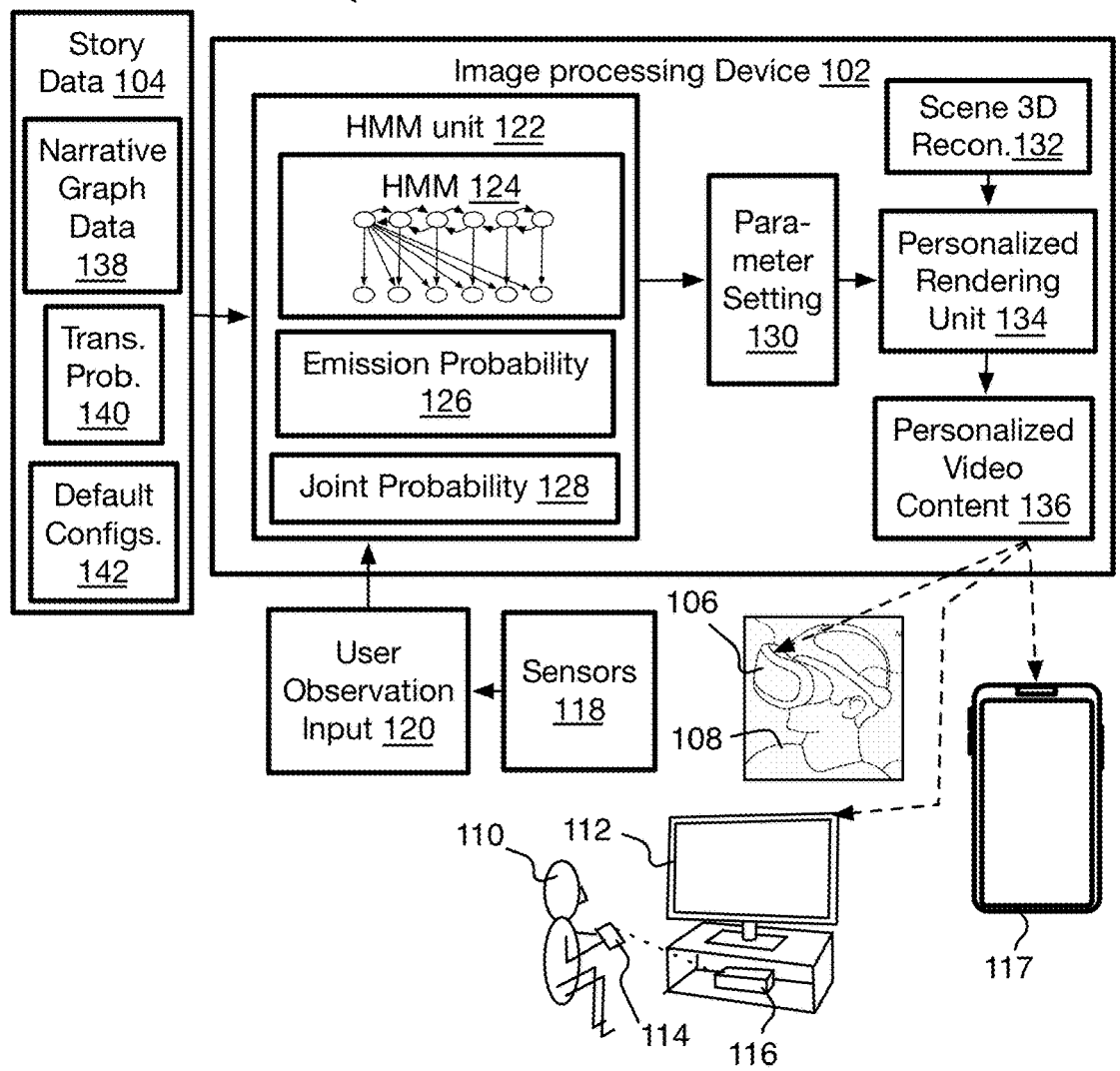
FIG. 1 is a schematic diagram of an image processing system and device for interactive storytelling according to at least one of the implementations provided herein.

One or more implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein also may be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as imaging devices, displays, televisions, monitors, head mounted displays (HMDs), digital cameras, smart phones, webcams, video cameras, video game panels or consoles, set top boxes, and so forth, but also remote devices such as a server or cloud devices may implement the techniques and/or arrangements described herein being, or being remotely connected to, a client or local display device or system such as a television, head mounted display, or other wireless device that can both display images and provide sensed input from the devices. Further, while the following description may set forth numerous specific details such as logic implementations, types and interrelationships of system components, logic partitioning or integration choices, and so forth, claimed subject matter may be practiced without such specific details. In other instances, some material such as, for example, control structures and full software instruction sequences and source code may not be shown in detail in order not to obscure the material disclosed herein. The material disclosed herein may be implemented in hardware, firmware, software, or any combination of these The material disclosed herein also may be implemented as instructions stored on a machine-readable medium or memory, which may be read and executed by one or more processors. A machine-readable medium may include any medium, article, and/or mechanism for storing or transmitting information in a form readable by a machine (for example, a computing device). For example, a machine-readable medium may include read-only memory (ROM); random access memory (RAM); magnetic disk storage media; optical storage media; flash memory devices; electrical, optical, acoustical or other forms of propagated signals (e.g., carrier waves, infrared signals, digital signals, and so forth), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", and so forth, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described herein.

Systems, articles, and methods of image processing for interactive storytelling with probability-based personalized views are described below.

A number of conventional interactive story applications exist where a user watching a display, such as a television with a remote control, or wearing a head mount display (HMD) to watch virtual or augmented reality (VR/AR) stories, can select to view an interactive media content scene among a set of available alternative scenes in a narrative graph of a story. The production of these scenes often requires traditional filming of the different scenes and use of software that manages the narrative story branches to concatenate the different scenes according to the user choices. The user usually relies on multiple choice selection by use of a TV remote or separate control or sensed gesture or positioning for an HMD. In the gaming domain, a first-person exploration game can use fixed game mechanics to present choices which advance the story. This may include heading toward an animated or real door in a video or pressing a button on an HMD that represents opening a door. Other programs watch gestures so that when a user moves an arm or points, a scene selection or selection of other objects can be performed.

These conventional interactive story viewing applications all have the same difficulty with personalization. The same visual outcome is shared by all users selecting the same sequence of scenes (also referred to as playthrough or storylines). One or more default or reference scene perspectives usually exist and that are produced by setting a virtual camera position and orientation to view objects in a scene. Some VR applications provide more freedom to move to a variety of perspectives. Also, usually no way exists to modify the appearance of the scene whether the lighting, colors, brightness, objects in the scene, the actors or cast in the scene, blur, lens distortions, and so forth. Such personalization of the scenes can completely change the experienced mood of the scene for a user. As a result, the conventional interactive story applications provide a very bland, generic experience that reduces the immersiveness of the experience.

In addition, the use of remote controls (whether touch or voice based), control buttons, or even the need for gestures that is not consistent with the action in the story also acts as a reminder of the mechanics of the device providing the story, and in turn, reduces the immersiveness of the application.

To resolve the issues mentioned above, the present method and system proposes a hyper-probabilistic interactive media application that relatively instantaneously, or in real-time or near real-time, creates a unique personalized storytelling experience via automatic personalized story flow scene selection and personalized modulation of scene appearance to increase the immersiveness of the experience. By one example form, a probability density function is used in a probability model, and in one example, a type of hidden Markov model (HMM) is used.

More specifically, the proposed method and system herein describes a probabilistic method that given a set of scenes (referred to as nodes of a narrative graph) and connections between default parameter configuration states in the scenes and forming different alternative storylines on the narrative graph, a probability model can automatically determine parameter configurations for personalized scene images. Such parameters may involve camera parameters, such as camera position and orientation, as well as other visual aspects of the scene images such as color, hue, blur, lighting (for example, depth of field, focal length, gamma, ambient, illumination, and so forth), cast, environmental changes, and so forth, and that are to be used in the rendering of the scenes. This is accomplished while factoring behavioral inputs of the user (or the user's state) to make the camera parameter determinations. The probability model also can be used to determine different storylines by automatically selecting scenes depending on prior selections and a user's behavior input to provide the user a very immersive experience.

In one form of the proposed solution then, user inputs including scene selection are not discrete decisions, but features derived from computational tracking of the user's state, including position, gaze, proximity to characters, speed of motion, image parameter selection dissimilarity to prototypical-views, and so forth. These may be considered continuous automatic decisions. It should be noted that the system and method herein may provide the continuous automatic decisions as an option and still provide a discrete decision mode or a mix of both modes as described below. As to the continuous automatic decisions here, raw numerical values from sensors in the form of time-series cues can be used or converted into a current image rendering parameter configuration, for example, to represent a user's behavior and may be used by the probability model to advance the storyline following a causal progression to determine personalized rendering parameters.

By personalizing the content and visual appearance, the viewer is guided through a unique experience flow, and the resulting "massive individualization" stories are stochastic, referring to the same playthroughs or scene trajectories in the narrative graph of the story that nonetheless can result in very different content and appearance than the default reference or prototypical scenes, and from user to user. A prototypical-view (or default or reference view) may refer to a fully intrinsic and extrinsic camera configuration and appearance, such as with brightness, illumination, contrast, color-mapping, hue tuning, and so forth, which has been preset by the story developer such as the photographer, editor, and filming or computer generation director, for example, to provide a generic reference or default experience for the observer or user. The default scenes or views as well as the image parameters can be provided automatically when a user does not wish to select the scenes and available image parameter options. The image parameters that form these default images are referred to herein as default parameter (or rendering) configurations.

Thus, the interactive storytelling operations herein have the ability to incorporate structural story branch flow and appearance modulation as a mapping of behavioral patterns of the observer and as arranged by a developer of the stories. These subtle and complex, time-varying user behavioral patterns are conceptually tackled as a hidden decision process which is probabilistic in nature and concretely sampled, for example, such as selected six degrees of freedom (DoF) of a pose to set a user's perspective of a scene as well as parameter values that represent the velocity and type of navigation along the experience track through the story narrative graph, user gaze detection, and so forth. It should be noted that the system may provide the user with options to change among the hidden decision mode (or continuous mode) to a discrete decision mode during the running of the story. As to the hidden decision process, it may be represented as part of the HMM. A machine learning approach such as the HMM provides one example ideal probability model mechanism to connect and track the space-time story assets and the non-deterministic, non-stationary probabilistic relationship to the specific parameters of each modulation schema for story flow, visual appearance of scene images, and acoustic features of the scenes. This can be accomplished by refining 2D projections from 3D reconstructions to form personalized scene images for display based on output personalized parameters from the probability model that factor, or map to, the user behavior input. To describe this another way, the 2D projections may be obtained from 3D renderings constructed by an HMD for example, and obtained from 4D data that are sequences of the 3D renderings (also referred to herein as 3D frames).

More specifically, and conventionally, the production of interactive storytelling media content required an enormous amount of effort to repeat filming of similar scenes to generate the content to fill the different alternative storylines of the same scene. Based on user choices, a subset of those scenes would be selected and shown to a viewer. More recently, volumetric reconstruction of a scene is used. Volumetric reconstruction captures a scene by an array of cameras and then reconstructs the scene in a 3D space by using point cloud reconstructions or other modeling techniques. This allows a developer to film the scene once and then render multiple scenes with different virtual camera positions and orientations as well as vary other visual aspects, such as colors, blur, lighting, and so forth. A different cast of live action even may be replaced such as by computer graphics programs that perform face or body swapping, or different environments may be used where objects or scenery can be replaced. This generates the content for the different storylines without the need for re-enacting and filming different takes.

While 3D reconstruction has been used for virtual reality and interactive stories before, the scene selection still was made by disruptive discrete user decisions, and although much of the appearance of the images for the interactive story could be changed, these changes are provided uniformly and generically for all users. Also, video rendering of a volumetric scene is a computationally expensive task, and the proposed stochastic and personalized rendering implies that the video renderings cannot be pre-computed and stored in long-term memory, but need to be computed as the content viewer experiences the story.

The present method and system herein, however, is an efficient merging of the 3D reconstruction and probability-based increased immersive experience by using a probability model factoring user behavioral patterns to output most likely desirable image-based parameters. These desired or personalized parameters can be used to refine 2D image projections from the 3D reconstructions to display the 2D images to a user as a scene image from the interactive story. To render a 2D projection in a virtual camera (position, orientation, and so forth) may be defined in the 3D volume space as mentioned. This rendering of the volumetric scene may be referred to as navigation.

Also by one form, a next scene of a storyline may be selected automatically by use of the probability model rather than forcing the user to make the selection. This uniquely merges a predesigned history telling path with individual behaviors at a scene-level. By other forms, the automatic selection may be provided as an option in addition to manual scene choices. By one example, this may be determined by using preset HMM transition probabilities that are used as weights to modify HMM emission probabilities that represent differences between the user's observable behavior and default image parameter configurations of a scene.

Thus, the present methods and system allow for automatic scene selection to avoid interruptions in the story experience and to determine which scenes of prerecorded content are displayed to the user, but also to provide a personalized rendering based on preferences and a variety of user input (such as speech, gaze, character proximity, etc.). The result is 2D scene images that represent the selection of tangential narratives as continuous variables rather than discrete decisions, while allowing the obfuscation and interpolation of narrative branches by automatic scene selection customized by the user's actions.

Referring to FIG. 1, an image processing system 100 has an image processing device 102 to generate personalized scene images for interactive stories. The system 100 also may have a display device such as a head mounted display (HMD) 106 worn by a user 108 to display the interactive story in virtual reality (VR) which provides full immersion or augmented reality (AR) which provides partial immersion where a user can still parts of the real environment near the user. In this case, the user's head motion, eye movement, and gestures may be sensed to control the action in the story. The image processing device may communicate with the HMD 106 through a base (not shown) remote from the HMD 106. Otherwise, a user 110 may view the interactive story on a television, monitor, or other screen 112 not worn by a user. It will be understood that the story may be viewed in AR or VR on the screen 112 as well, such as when a user wears special glasses for that purpose. In this case, the user 110 may control the scene selection and perform other actions using a remote 114 (whether button, touch, or voice controlled) that often communicates with a game console or cable box 116 to control the views on the screen 112. Another option to view the interactive story is a smartphone 117. These are example displays and the type of display is not particularly limited as long as the interactive display can be viewed, one or more users can control selection for the stories, and observable user behaviors can be sensed as described herein. Another example could be to have multiple displays communicating over a computer or other network so that the behavior input of multiple users may be received to perform the automatic personalized scene and parameter configuration selection as described herein.

The image processing device 102 may be on-board one or more of the display devices or may be remote from the display and communicating over a computer or other network, such as the internet. In the latter case, the image processing device may be, or may be on, a remote server or computer, a graphics cloud, and so forth to name a few examples. This may include being remote over a personal area network (PAN) and communicating by Bluetooth® for example, other short range networks, or other line-of-sight networks. In these cases, the image processing device may be located at a base of an HMD or game console for example.

In order to obtain user behavior input, sensors 118 near the user provide data that indicate the motion, position, and other relatively instantaneous observable actions and preferences of the user. For example, the HMD 106 may have on-board sensors and/or external sensors, whether on the HMD itself or remote from the HMD and facing the user wearing the HMD, for position tracking to determine the position and angular orientation of the HMD as well as the pose of the user in a 3D space. By one form, the sensors may be paired with a projector such as a laser or infra-red (IR) emitter or other light projector to detect light reflecting off of objects (or the HMD itself) that may have markers to aid direction and distance finding. In a lighthouse technique, the projector floods a room with light for this purpose. By yet other alternatives, sensors may be cameras such as a 3D or RGBD type cameras that can reconstruct a 3D space and may provide a depth map. Another alternative may be one or more RGB cameras that can be analyzed with computer vision techniques such as neural networks to extract 2D or 3D viewer pose and motion patterns. Other sensor types, such as inertial measurement unit (IMU) sensors as well as others, can be used for orientation as well as motion or location measurement such as an accelerometer, magnetometer, gyroscope, global positioning sensor (GPS), and so forth. A television, smartphone, game console, other display device, or image generating device, may have many of these same sensors. With cameras facing a user as well as the other sensors mentioned, the system 100 can detect observable behaviors such as the facial position, gaze direction, body position, proximity to objects in a scene, direction of motion of the user, and speed of motion of the user. An HMD may have internal cameras to capture eye gaze direction. Microphones also may be used to capture speech by the user. These devices may provide raw sensor data to determine these behaviors. The position and motion-related behaviors detected over time may be considered behavior patterns.

The sensor unit 118 includes any of the sensors being used to sense user behavior no matter the location of the sensor. The sensor unit 118 may generate the raw sensor data, and the raw sensor data that is used to create the perspective of the images to be displayed on the display screen then may be compressed and/or otherwise formatted for transmission to a base (when provided) and re-transmitted to the image processing device 102, and specifically a user observation input unit 120.

The user observation input unit 120 receives the sensor data from sensors 118 and uses the senor data to compute current image parameters to form a current (or actual) image parameter (or rendering) configuration. By one example, a vector of current parameter values may include values for six degrees of freedom (DoF) for camera pose (X, Y, Z translation directions and rotational directions Y, P, R for yaw, pitch and roll), two DoF values for focal distance such as a close value and a far value that indicates the depth of the user's perspective.

Other user selectable image parameters also may be considered to be observable parameters. These may include image or rendering quality or mood parameters that can be set by a user when the story application provides such ability such as three DoF values each for brightness, contrast, and hue in a certain color scheme such as RGB or YUV, and may include values for type of lighting, blurring and/or transparency. The observable image parameters also may include five or other number of DoF values for lenses distortion which may refer to a range of variations in radial distortion among regular, wide-angle, and fisheye views to name a few examples. Additional or alternative parameters may be used instead. Yet other user selectable image content also may be considered observable behavior for the purposes herein. This may include selecting swappable people or characters, objects, and/or scenery to be visible in the environment forming a scene. The user observation unit 120 may or may not be considered part of the image processing device 102 and/or a hidden Markov model (HMM) unit 122.

By one form, the sensor data is communicated by wireless or wired transmission to the user observation unit 120, and the user observation unit 120 is physically located on a same device as the image processing device 102. By one form, the sensor data is transmitted from the display, external sensor devices, an HMD, and/or the HMD's base to the image processing device 102 on networks providing sufficient bandwidth to provide data at least at about 50 ms although it could be about 8-10 ms from a previous rendering. More particularly, assuming a frame rate for VR is 120 hrz@60 fps per eye, then 8.3 ms maximum latency is available during each roundtrip. Thus, a time window of about 417 microseconds exists to send the sensor information. Now if the sensor information is filtered and fused in an HMD, and the system sends six DoF pose data, six DoF velocity data, six DoF acceleration data, and a timestamp, this will result in an absolute minimum (without control status such a buttons pressed and so on) of 18 real values encoded as floating point at 32 bits, and therefore, a package of 76 bytes may be sent within that period. Thus, a lower bound that should be used may be at least about 182.4 kB, or in other words, about 1.5 Mbit. This is easily handled by any Bluetooth or similar technology for example which often provides about 23 Mbit transmission. Since the operational frequency is relatively flexible for this, the range of about 2.4-3.5 MHz of Bluetooth or other similar technology will be adequate. This will at least depend on the type and number of sensors used as well as the compression techniques. The network used to communicate sensor data between the HMD and the base may be a high bandwidth, low latency network such as WiGig by one example, although other networks could be used as long as sufficient latency and throughput characteristics are provided to support AR/VR or other interactive story applications. It will be appreciated that many different arrangements to communicate sensor data to the user observation unit 120 are contemplated.

The image processing device 102 has the HMM unit 122 mentioned above, a parameter setting unit 130, a scene 3D reconstruction unit 132, a personalized rendering unit 134, and a personalized video content unit 136. In operation, the image processing device 102 receives story data 104 to input into the HMM unit 122 and loaded onto a probability model, here in the form of an implicit HMM 124. The story data 104 includes narrative graph data 138 that lists which scene or scenes can be selected after a particular previous scene, and in turn, inherently or expressly, the alternative scene orders of the story (also referred to as storylines and/or trajectories). Such a narrative graph 400 is described below with FIG. 4. The narrative graph may be pre-loaded (before a run-time) and may be fixed until the HMM unit 122 is updated for changes to the story or loaded with a different story. The story data 104 also may provide any other data such as story content or image parameter data that is not already provided by the HMM output and the 3D scene reconstruction unit 132. This may include image data values, image content such as objects or character data, image parameter settings, audio to accompany a scene, and any other content or image parameter that may be needed to construct a personalized scene image. This other data may be retrieved by the personalized rendering unit 134 when projecting 2D images and constructing the personalized scene images.

The HMM 124 is exemplified by a simplified HMM 600 (FIG. 6) described below for explanatory purposes. The HMM 124 has transition probabilities between hidden states, and emission probabilities between the hidden states and observation states. The transition probabilities 140 provided by the story data 104 may be fixed and preset by the developers of the story and then provided to the image processing device 102, with an interactive story application for example, to pre-load to the HMM 124. Default or prototypical image parameter (or rendering) configurations 142 determined by the story developers also may be provided and uploaded to the HMM unit 122 for populating the hidden states of the HMM 124. These also may remain fixed during run-time as with the transition probabilities. The reasons for fixing the transition states and default parameter configurations are explained below.

The HMM unit 122 may have an emission probability unit 126 that generates emission probabilities. The emission probability unit 126 either obtains a current parameter configuration from the user observation input unit 120 or generates the current parameter configuration. This may be in the form of a vector of values with each value representing a specific user parameter or image parameter selected by the user. The emission probability unit 126 compares the current parameter configuration of a scene to one or more of the default parameter configurations of the same scene, and the difference may be scaled to de-emphasize differences in units. The difference may be computed as a normalized distance that is converted into a normalized probability. The emission probability unit 126 then provides a highest emission probability among one or more HMM hidden states of a single scene to indicate which default parameter configuration should be used to form a visual image parameter configuration of a current scene (or more particularly, for the current scene and for a current frame, view, or refresh). The actual determination of the visual image parameter values is generated later by a parameter setting unit 130 described below.

Returning to the HMM 124, the HMM unit 122 also has a joint probability unit 128 that operates a joint probability equation that automatically indicates which default parameter configuration (and hidden state) is a current configuration to be used to generate a personalized scene image. This also simultaneously indicates which scene is a next scene along a trajectory (or storyline) of scenes when the jump from one default parameter configuration to a next default parameter configuration is a jump between scenes. The joint probability unit 128 obtains the emission probabilities of the individual default parameter configurations and the transition probabilities which may be obtained from a transition probability matrix of all transition probabilities of the story, and obtained trajectory by trajectory. The joint probability equation is then performed to evaluate each available trajectory, and at each refresh or new frame for example, so that a probability is generated for each or multiple trajectories. The trajectory with the highest joint probability indicates the automatically selected default parameter configuration to be used and which scene is to be the current (or next immediate) scene relative to a previous scene if a scene change occurs.

Once the scene and default parameter configuration is selected, the parameter setting unit sets the parameters to be used to generate the current personalized scene image. This simply may be using the selected default parameter configuration assumed to have parameters being sufficiently close to the current parameter configuration, or by generating interpolated parameters between the current and selected default parameter configuration. Otherwise, the parameters may be interpolated among multiple default parameter configurations according to the proportions of the probabilities for example, and either with or without the current parameter configuration as well.

Thereafter, the 3D reconstruction (or 4D volumetric film) of the scene is obtained from the scene reconstruction unit 132. The 3D reconstruction unit 132 may have all pre-constructed 3D or volumetric reconstructions of all scenes. By one form, where the scene needs to be constructed on the fly, as with HMDs providing AR for example, the 3D reconstruction unit 132 may hold basic 3D structure of the scene with content relevant to the story, and the user may be instructed to view a certain environment such as a rectangular room for example so that the 3D reconstruction can be warped to fit the room. Many variations for fitting the 3D reconstruction to real-time views are contemplated.

The personalized rendering unit 134 obtains the image parameters from the parameter setting unit 130 to generate a 2D personalized image. The personalized rendering unit 134 also may obtain the other data including any story content data that is not already provided by the HMM output and the 3D scene reconstruction unit 132 including image data values, image content such as objects, audio to accompany a scene, and anything else that may be needed to be placed into the scene image. The personalized rendering unit 134 then projects the 3D reconstruction to form the personalized 2D scene image using the parameters and content of the collected data The personalized image then may be placed in a video by a personalized video content unit 136 and transmitted, such as by encoding and decoding, to one or more of the example display devices 106, 112, or 117 for display on a screen to a user. The result is that the image processing device 102 can derive features from a user's state that can be used by the Hidden Markov model (HMM) 124 to automatically advance the viewer along the storyline following the narrative graph 138 and while determining personalized modulation schema (or parameter configurations) of the scene. This may include audio to accompany an image as one of the parameters.

Figure 2:
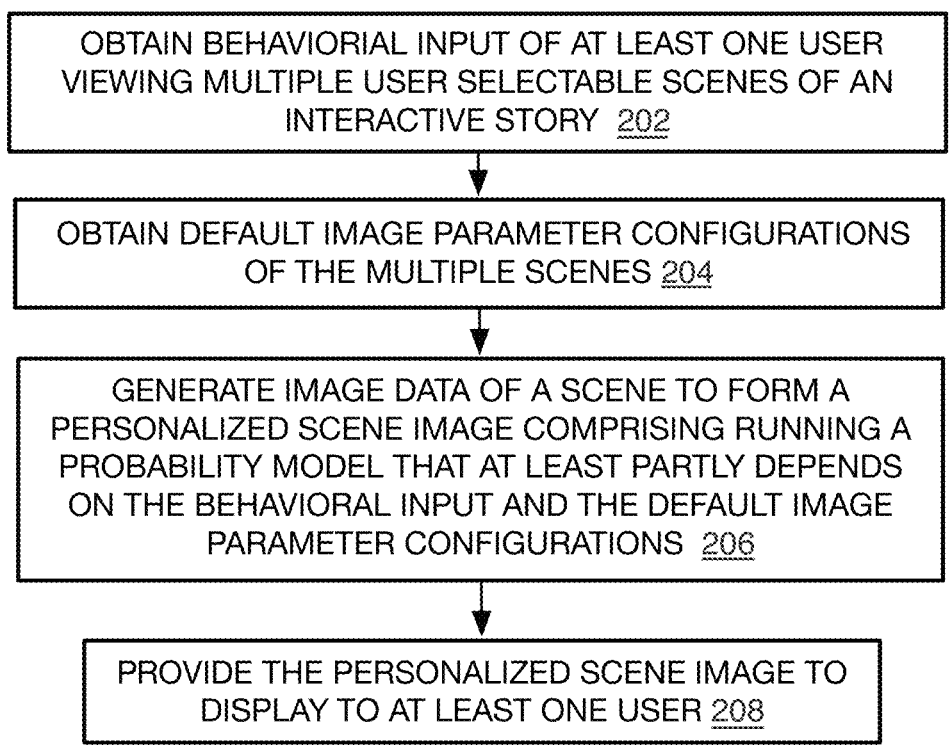
FIG. 2 is a flow chart of a method of image processing for interactive storytelling according to at least one of the implementations herein.

Referring now to FIG. 2, by one approach an example process 200 is a computer-implemented method of image processing for interactive storytelling with probability-based personalized views. In the illustrated implementation, process 200 may include one or more operations, functions, or actions as illustrated by one or more of operations 202 to 208 numbered evenly. By way of non-limiting example, process 200 may be described herein with reference to example image processing systems 100 or 800 of FIGS. 1 and 8 respectively, and where relevant.

Process 200 may include "obtain behavioral input of at least one user viewing multiple user selectable scenes of an interactive story" 202. This first may include obtaining or generating raw sensor data, or by obtaining user selected image parameters. This may occur before the story is activated or at certain defined key time points in the story such as at selected individual key frames of a video sequence being displayed to a user. This may include obtaining such data directly via menus, indirectly via mapping either from an HMD and the HMMs mechanisms and/or the HMD motion, controls, user gestures, and so forth. The sensors may be used to determine a user pose, such as a position of a head or body of a user, eye gaze, motion, speed of motion, a position within a 3D space forming the scene to be displayed, or any combination of these. The user selected image parameters may be related to focal distance, type of lighting, brightness, color, contrast, hue, blur, transparency, lens distortion, cast (referring to specific actors) in the scene, environment or objects on the scene, or any combination of these as well. The behavioral input also may be just the sensed parameters, just the user selected image parameters, or any one of the parameters.

By another example form, one or more of the parameters may be monitored over time or more than one user may be being monitored. In this case, the most used or most popular (or other group-based criteria) user selectable image parameter settings may be determined over a certain number of samples or at a certain time instant, and provided for personalizing the scene images. This may occur when one or more users are viewing a story on certain networks, game websites, or social websites for example. Also, such social networks may permit personalized parameter configurations to be shared among users when one user creates a particularly enjoyable personalized scene image.

This operation also may include converting raw sensor data or the selected parameters into values to form a current parameter (or rendering) configuration. Thus, the image processing device may receive or generate the current parameter configuration as a vector where each value (or element) and element location in the vector represents a specific type of parameter.

Process 200 may include "obtain default image parameter configurations of the multiple scenes" 204. Here, the developers of the story provide one or more predetermined default prototypical parameter (or rendering) configurations per scene and with at least some of the same parameters as the current parameter configurations. By one form, all of the parameters are the same. A single scene may have more than one default parameter configuration such that a scene may be shown over a portion of a video sequence of frames so that a storyline or trajectory may proceed along a number of different parameter configurations in the same scene before moving to a different scene. For one example, these default parameter configurations are used to display images to the user when the user does not make parameter configuration selections and a mode is not activated to automatically personalize the parameter selections as disclosed herein. These default parameter configurations, however, also are used during the personalization of the parameter configurations or scene selection or both.

Process 200 may include "generate image data of a scene to form a personalized scene image comprising running a probability model that at least partly depends on the behavioral input and the default image parameter configurations" 206. The probability model can be used to determine advancement of the storyline (or flow through nodes in a narrative graph) and the modulation schema (such as camera position for rendering, other visual aspects, audio, and so forth) given the viewer's state including the time-varying behavioral patterns or inputs mentioned above as well as the user selectable image parameters mentioned above.

Specifically, the probability model may be a many-to-many probability density function model, and by one form is an HMM. The observation states of the HMM are the current parameter configurations that represent the user behaviors (or behavior patterns over time). The user behaviors include both sensed position and motion of the user as well the user selectable image parameter settings. The hidden states of the HMM each may be related to one of the default image parameter configurations of a scene, and where each scene has one or more hidden states each with a default image parameter configuration. To generate emission probabilities, the system compares (or differences) the current parameter configuration to one or more default parameter (or rendering) configurations of a single scene. The differences may be scaled to de-emphasize unit differences among the parameters. The emission probability of each comparison is determined by using a normalization function, and by one form is the difference divided by a sum of the differences between the current and each default parameter configuration of the scene. The highest probability indicates the default parameter configuration to be used to generate a personalized scene image for that scene and for a current frame or refresh instant in time.

A joint probability equation may be used to determine a probability that a certain scene trajectory should be used for a current scene, thereby inherently selecting the current scene when multiple alternative scenes are available and while also selecting the default parameter configuration to be used to generate image parameters to in turn generate the personalized scene image. The joint probability of a trajectory is at least partly based on a first default image parameter configuration probability of each scene in the trajectory and an HMM emission probability of the first configuration. This provides consistency in the story telling when switching from one scene to the next scene to avoid jumps in parameter configurations that are too large and would be noticeable and disruptive (unless intentionally designed to do so by the story creators). The joint probability equation also uses transition probabilities between potential current and previous default image parameter configurations that each form a hidden state of the HMM on the trajectory being analyzed. The HMM emission probabilities of the default image parameter configurations are also considered. Specifically, the joint probability equation uses the transition probabilities as weights to adjust the emission probabilities. The transition probabilities can be used to guide the scene selection toward certain scenes or scene sequences desired by the developers of the story by giving the more desired scenes larger transition probabilities. By one form, the joint probability equation particularly determines the joint probability as the product of the emission probabilities of the trajectory being analyzed where the emission probabilities are adjusted, or multiplied by, the transition probabilities, the product is multiplied by the mentioned first default parameter configuration emission probability, which is taken as one because the entry point of each scene may be deterministic, for example on single-entry/multiple exit topology. With this arrangement, scene selection is based on a chain of scene selections rather than being distinct decisions.

Once the highest joint probability is obtained for the most likely scene trajectory, the system generates personalized visual image-related parameters of the individual scene at least partly based on the indicated default parameter configuration of the scene with the highest joint probability. This may include using the parameters of this default parameter configuration, or for more accuracy, interpolating the parameter values between those of the current and default parameter configuration. Once the parameters for the personalized image are obtained, 3D reconstructions of the individual scenes are obtained, and the system may generate 2D projected images projected from the 3D reconstructions of the scenes and while using the personalize image parameters to form the personalized scene images.

Process 200 may include "provide the personalized scene image to display to at least one user" 208. Here, the generated personalized scene image may be placed in a video of the images and transmitted or otherwise provided to a display of one or more users as described herein.

Figure 3B:
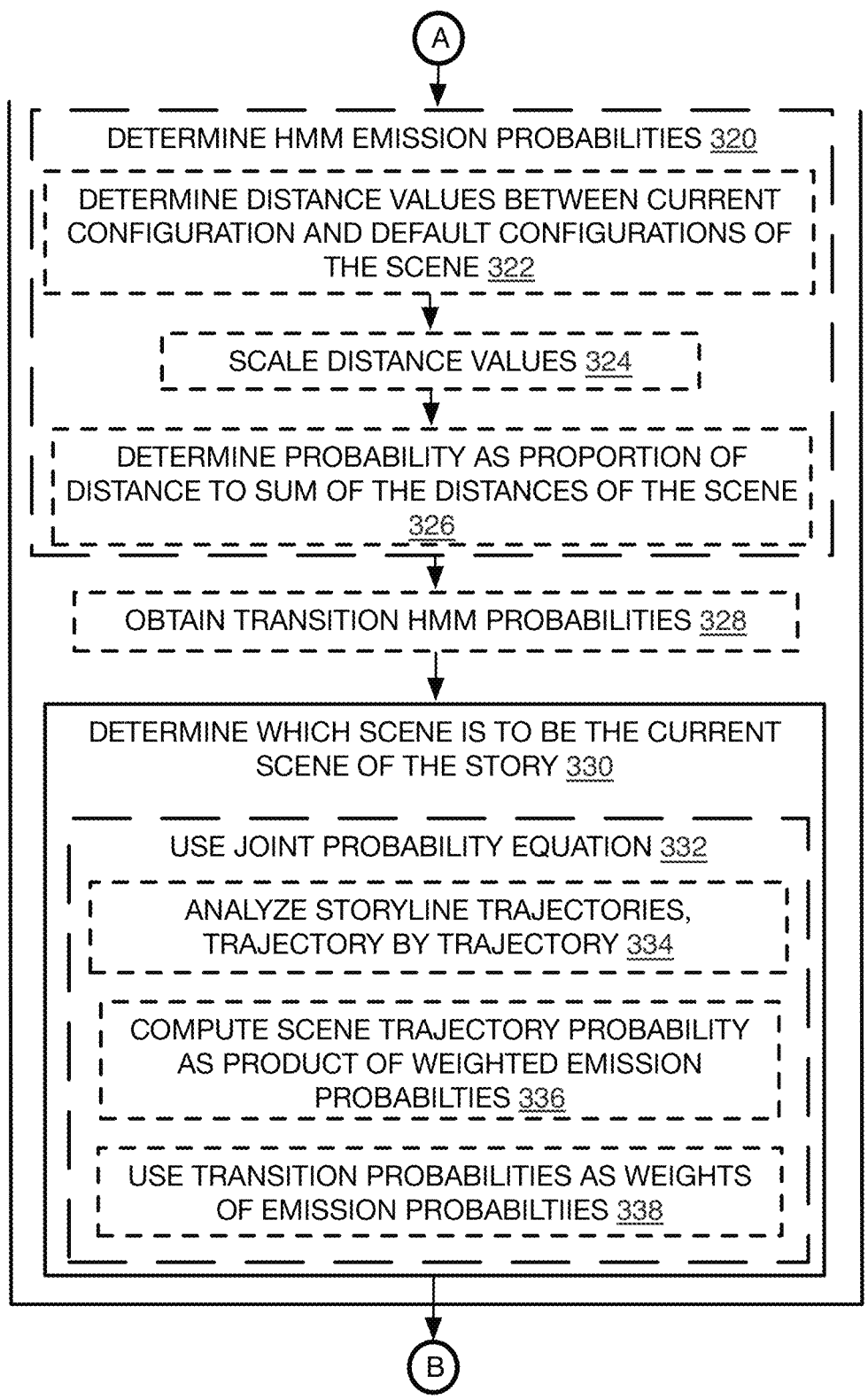
Figure 3C:
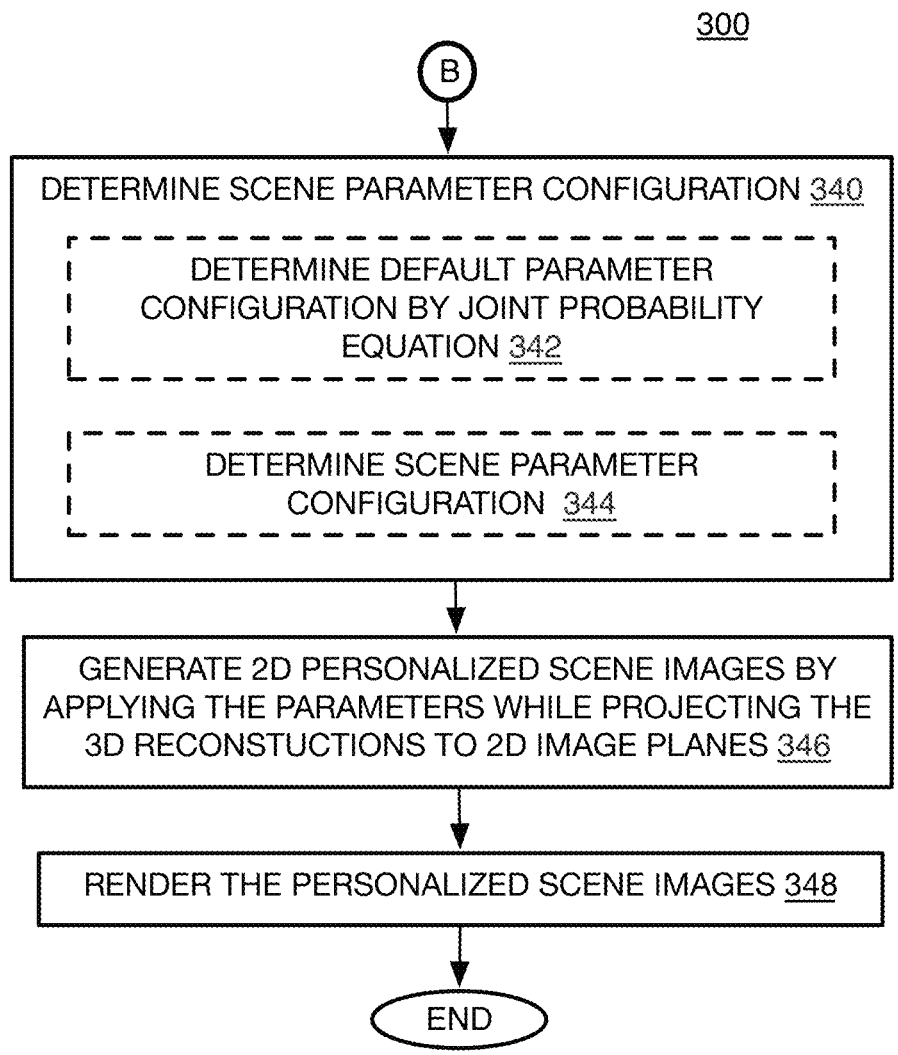

Referring now to FIG. 3, by one approach an example process 300 is a computer-implemented method of image processing for interactive storytelling with probability-based personalized views. In the illustrated implementation, process 300 may include one or more operations, functions or actions as illustrated by one or more of operations 302 to 348 numbered evenly. By way of non-limiting example, process 300 may be described herein with reference to example image processing systems 100 or 800 of FIGS. 1 and 8 respectively, and where relevant.

As a preliminary matter, the personalization operations may need to be activated by the user depending on the interactive story application being used. The activation of the personalized parameter configuration and personalized scene selection may be inseparable or may need to be activated separately. As to activating the personalized parameter configuration settings alone, process 300 may include "determine if automatic rendering configuration mode is activated" 302. Specifically, the interactive story application may permit a user to select a fully automatic parameter mode (or personalized parameters activated mode) which maintains the parameter personalization operations in an activated state. In this mode, the user is prompted or otherwise provided the opportunity to select image parameters for the scenes. The user selected image parameters and the sensed user position and motion data is then collected and automatically used to form the personalized parameter configurations for the personalized images using the probability model in a consistent manner with other scenes. In this mode, the user will be prompted for parameter preferences before the story starts such that the user's preferred parameters may or may not be obtained for more than one scene, and may be a single configuration of user selected image parameters for all scenes. By one form, the user is prompted before the story starts to provide parameters for each key scene designated as key by the story developer. The parameters may be saved for the next time the user runs the same story.

In furtherance of the user input, the user input may be based on a cinematography preference or user profile from an online video streaming service for example, and that includes user information regarding preferred genres, directors, producers, and so forth. This might be accomplished by showing a user a scene or environment without characters or important content for example but with alternative parameters (such as different background colors as one example) and then ask the user which parameters are more appealing. This questioning can be pre-organized or preset by the profiles.

In a parameter deactivated mode, a default parameter configuration is maintained for each scene without user input. This may be a default parameter configuration selected for each scene by the developers of the story. In a parameter default mode, the user may still provide image parameters according to a prompt for example, but the default parameter configurations will be used when no input is received by the story system. In an optional mode, the personalized parameter configuration is suggested to the user while the user has the ability to change the listed parameters of the configuration. The suggested personalized parameter configuration may be computed in real-time and ready for a current run of the story or may be from a previous run of the story by the same display device (which assumes the same user is using the display device).

As to the scene selection, process 300 may include "determine if automatic scene selection mode is activated" 304. When a fully automatic personalized scene selection mode is activated, the scene selection is performed by collecting the sensor data as mentioned and by collecting the user's parameter configuration selections and sensed monitoring data whether or not the automatic personalized parameter configuration mode is activated since the personalized scene selection uses the same user data. In this mode, the user permits the automatic selection of scenes along a storyline rather than permitting the user to make scene selections in order to provide a very immersive, seamless story experience without disruptions caused by discrete decisions of the scene.

In the fully manual scene selection mode, the user may be forced to select among optional scenes when such an option is presented. In this case, the user may be provided instructions to press a button on a control, take a position in a virtual 3D space of a scene, or look to a certain direction as a few examples to select a scene. By one example form, the menu or buttons to select the manual mode could provide a visual hint on which scene is the most likely for the user to go next based on the HMM. In this case, the other paths will work, but the experience may not be as immersive or enjoyed. In this way, the $Z_u$ hidden paths still are indirectly influencing the user decision and the probabilistic feature is still being used. This manual mode also may include a default aspect so that a scene is automatically selected after a certain time period if the user does not select a scene. This may be a default scene trajectory preset in the story or, by one example, may be a personalized scene selection as described herein. By other examples, the user may be provided with an automatic personalized scene selection suggestion option in addition to the other manual scene options.

Figure 4:
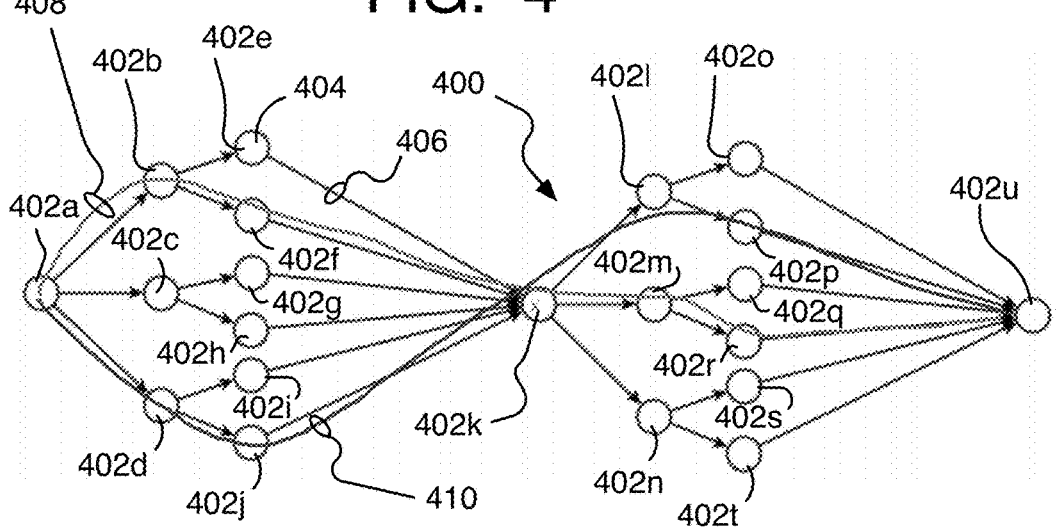
FIG. 4 is a schematic diagram of an interactive narrative graph according to at least one of the implementations herein.
Figure 5:
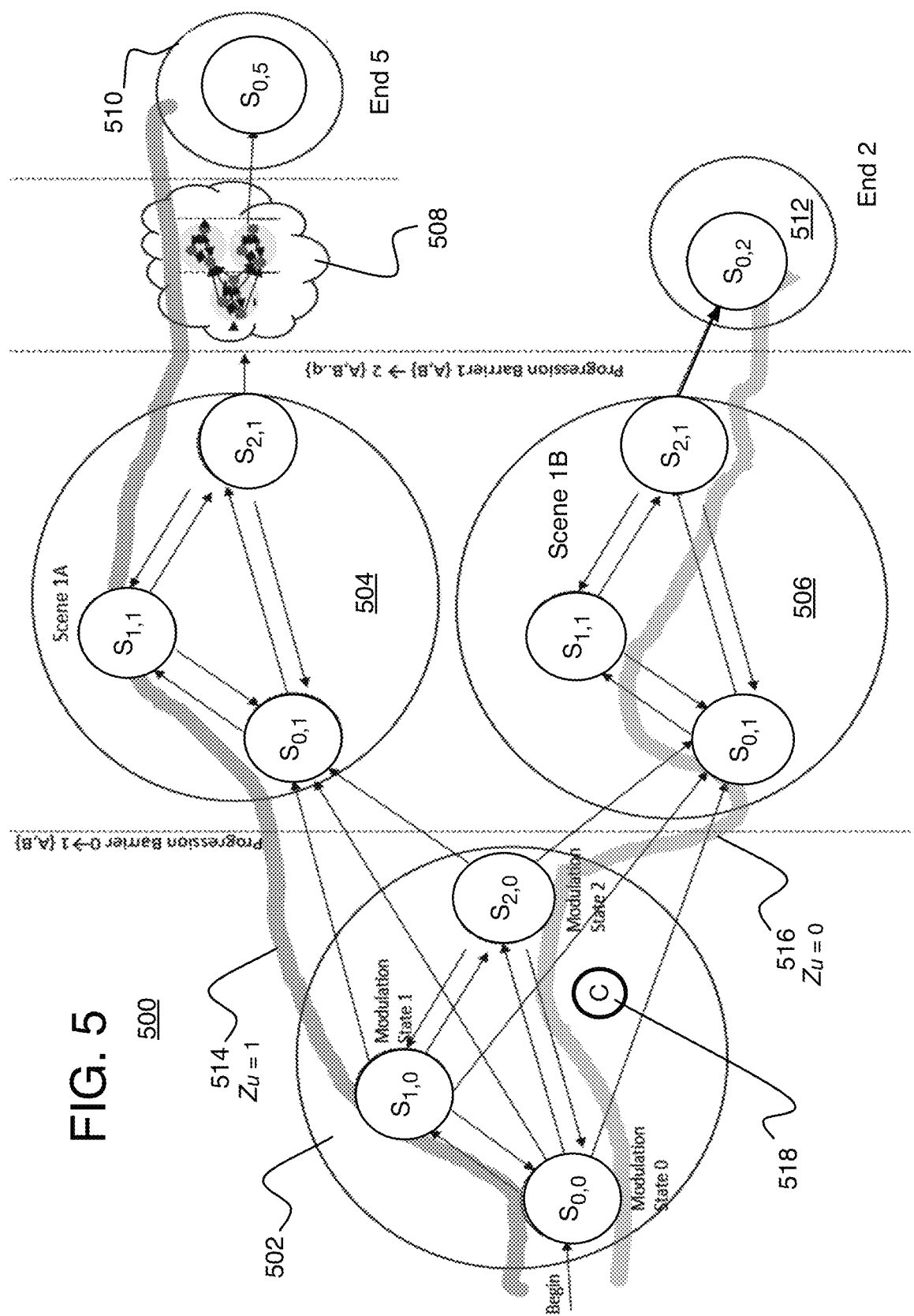
FIG. 5 is a schematic diagram of an interactive narrative graph for probability model operations according to at least one of the implementations herein.

Referring to FIG. 4, process 300 may include "obtain narrative graph data of scenes in an interactive story" 306. An example interactive narrative graph 400 has node 402a to 402u where each node is a scene 404 that has an available order or trajectory according to the arrows 406, also referred to as an experience trajectory. Each node 402a to 402u represents a single scene, but each single scene can have multiple default parameter configurations. According to this arrangement, a single scene can form a sequence of multiple personalized images where either the same default configuration is used for multiple images or the same scene jumps from default parameter configuration to default parameter configuration assigned to that single scene. This is described in greater detail below with a close-up narrative or flow graph 500 (FIG. 5).

The narrative graph 400 also shows two example traces, paths, or trajectories 408 and 410 that represent two of the possible narratives or storylines in this interactive experience. Thus for example, both storylines 408 and 410 start at scene 402a, and the first scene selection is between scenes 402b, 402c, or 402d. As mentioned, this selection may be obtained automatically or manually. Here, storylines 408 and 410 are simply two possible options. Storyline 408 next includes scene 402b, while storyline 410 includes next scene 402d, and so on. Thus, the entire storyline 408 shown here includes scenes 402a, 402b, 402f, 402k, 402m, 402r, and 402u. Likewise, storyline 410 includes scenes 402a, 402d, 402j, 402k, 402l, 402p, and 402u. Thus, in this interactive media, the storyline is not predetermined, and the user experiences a unique story based on their interactions with the story world. The narrative graph 400 may be obtained as data in any known convenient and efficient format such as a list of nodes in a certain order that inherently provides which subsequent scene(s) can be selected from which previous scene. The graph 400 may be updatable by the product developer or supplier, or even by settings obtained from social media. The graph may have hidden content made accessible by such updates and so that later production and additive updates are not necessary.

Referring again to FIG. 5, process 300 may include "obtain one or more default parameter configurations of individual scenes of the story" 308. An example close-up of a narrative graph 500 shows scenes 502 (scene 0), 504 (scene 1A), 506 (scene 1B), 510 (scene 5), and 512 (scene 2) that is each a node on the narrative graph 400 for example. The scene number indicates the narrative graph layer or scene layer separated by progression barriers (dashed lines) in the narrative graph. Scenes within the same layer or between the same progression barriers are designated with the same numeral but different letter (e.g., 1A and 1B). A sub-graph portion 508 may be a sequence of the scenes provided to show that one storyline may be longer than another storyline. Scenes in the same layer usually will be alternative scenes but could be sequential instead. Each scene may have one or more preset or default (or prototypical or reference) alternative rendering configurations (also referred to as default parameter configurations). Thus, in a given hyper-probabilistic media product (such as a film or video sequence), each scene has multiple possible default parameter configurations which can be understood as the available execution paths. Two example paths 514 and 516 are shown and form available scene trajectories or storylines. The default parameter configurations are designated as states $S_{f,w}$ where f is the default parameter configuration (or modulation state) number or index of a scene (here shown as modulation states 0 to 2 for a scene 0 with three default parameter configurations), and w is the scene number or index. For example, the first or initial default parameter configuration of the first scene is $S_{0,0}$.

By one form, the default parameter configurations are predetermined by the story developers before a run-time by users. The default parameter configurations may include parameters based on camera position, and in turn expected or preferable user position when a user is running the story, and selected image parameters. The parameters may include different visual image-related parameters such as six degrees of freedom (DoF) for a camera pose (including X, Y, Z translation directions and rotational directions Y, P, R for yaw, pitch and roll for example), two DoF for a focal distance such as a typical close distance and a typical near distance, three DoF for brightness, contrast, and hue each, such as with an RGB or YUV color scheme, or even physically-based rendering (PBR) schemes, but may include other channels, five DoF lens distortions by one example that vary in radial dimension such as one of five different available image radius extents for example. The parameters also may include codes for type of lighting, a certain cast (certain actors that can be swapped by overlaying and so forth), certain objects, or certain backgrounds or scenery especially for animation for example, and even accompanying audio to go with the scene. Each default parameter configuration $S_{f,w}$ is on a hidden state of an HMM probability model as described below and on a storyline (or scene trajectory) $Z_u$ as shown by the paths 514 ($Z_u$=1) and 516 ($Z_u$=0) on FIG. 5 as a couple of examples. These default parameter configurations are designated as a vector $\psi_i$ for probability computations below.

Figure 7:
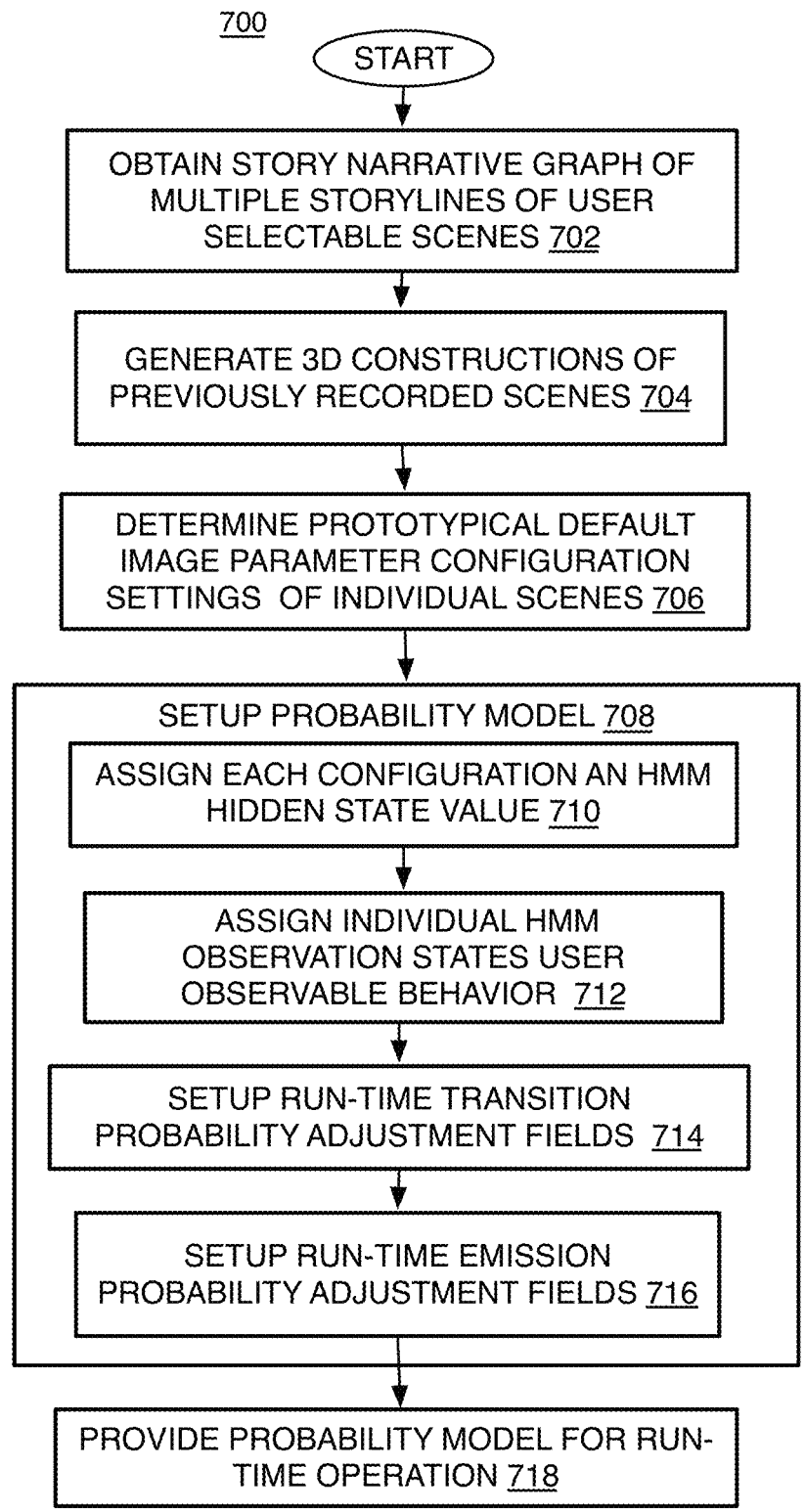
FIG. 7 is a flow chart of a method of setting up an interactive storytelling application using a probability model according to at least one of the implementations herein.

Process 300 may include "obtain 3D reconstructions of the scenes" 310. By one form, the 3D reconstruction (or 4D volumetric video) of the multiple scenes, or updates of the 3D reconstructions, may be generated before run-time of the story applications by users, and may be uploaded to the story before the story is available to users or before a user operates the story application. By one form, the scenes are reconstructed by using multiple cameras as mentioned below with process 700 (FIG. 7).

By another form, however, when augmented reality is being used and the complete 3D reconstruction of a scene is largely unknown beforehand, the detailed 3D reconstruction may be generated during the run-time when the story is being viewed by a user. In this form, the predetermined 3D reconstruction of scenes may include a scene framework, certain animated features, and/or other real-world content that is to be used to overlay a real-world real-time 3D reconstruction of a captured scene during a run-time of the story. In this latter case, the user may be provided instructions as to where to view the story, such as indoors in a rectangular room, and so forth. The predetermined 3D reconstructions should have sufficient detail and size to provide any virtual view that may be desired by a user. The details for obtaining the 3D reconstruction are provided below with process 700 (FIG. 7).

The following operations occur during a run-time while at least one user is viewing an interactive story on a display, and is being monitored by sensors as described herein. It will be understood that multiple users may be viewing the same story on multiple devices such as in a video conference setting or multi-user online game setting for example. User selectable image parameter settings also may have already been received by one or more users, and as described below as part of the user behavior.

Accordingly, process 300 may include "obtain user behavior data during run-time" 312. This may include obtaining sensor data from monitoring the user and the area immediately around the user while the user is viewing the story. By one form, this may include collecting the observable sensor data from the sensors 118 mentioned above with image processing system 100 in order to capture observable viewer states including position, gaze, proximity to characters, and so forth. As to the user selectable image parameters, this operation may include obtaining the settings of the selectable focal length (or zoom), color, hue, contrast, blur, transparency, type of lighting, objects in the scene, cast in the scene, and whatever other user settings exist and that are included as parameters in both the default and current parameter configurations.

This operation also may include obtaining the behavior data from multiple users where all of the users may have the same display device, such as HMDs, or the users may have a number of different devices where some have an HMD, others are using televisions, others are using a computer of smartphone, and so forth. The behavior data may be obtained from all users or only certain ones of the users, or a single user that represents a group of users.

Process 300 also may include "run probability model" 314. The probability model may be used to take time-varying behavioral input (such as the eye gaze, character proximity, speech, image parameter settings, and so forth) of the user, and advance the storyline following causal progression of the narrative graph or, in other words, provide automatic scene selection at least based on user preferences and/or behavior to avoid reducing the immersive experience of the user. Also, the probability model may be used to determine the visual image parameter configurations (or modulation schema) that is the camera pose, blur, and other visual effects to be used in the rendering of a scene.

Figure 6:
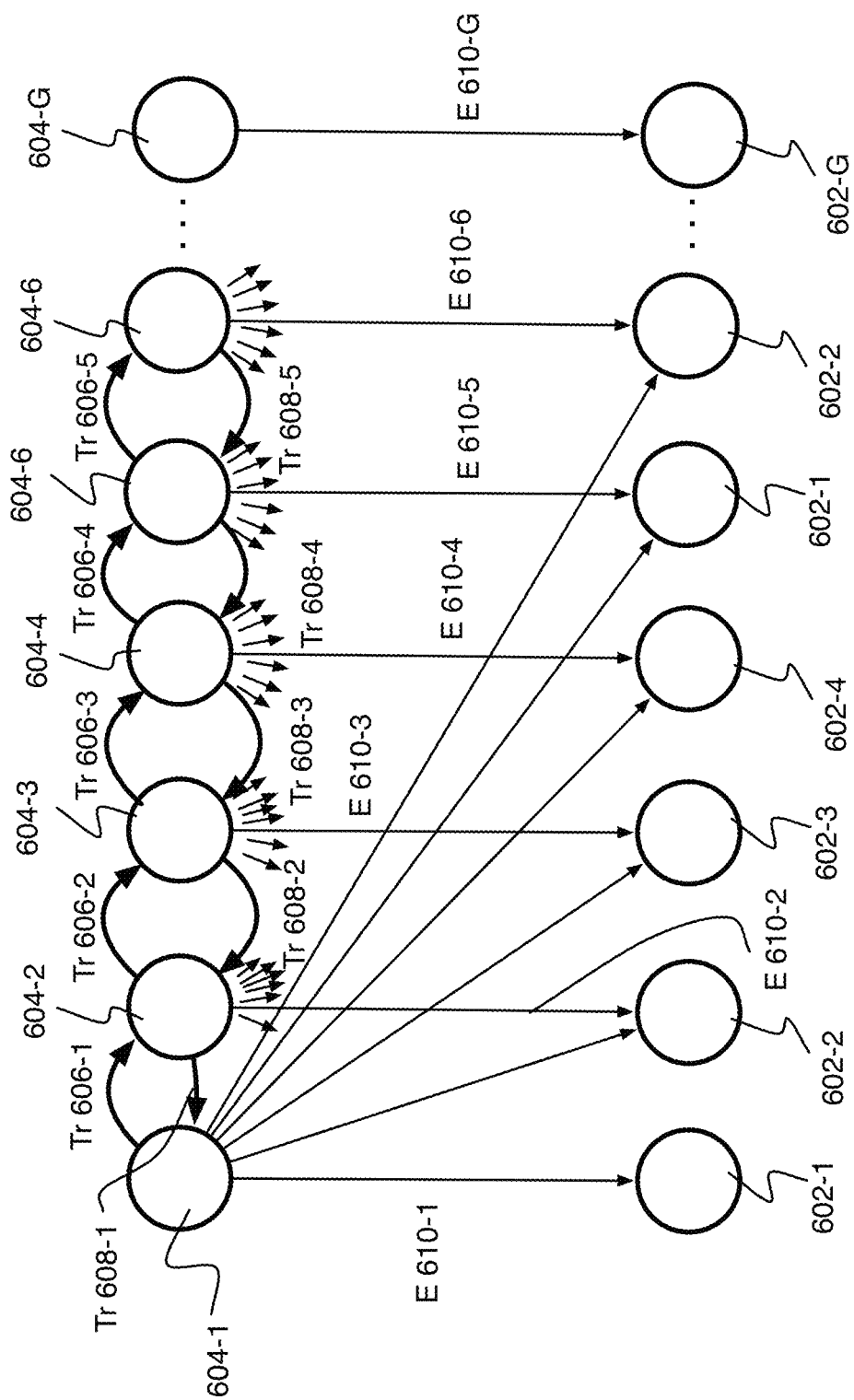
FIG. 6 is a schematic diagram of an example simplified hidden Markov model according to at least one of the implementations herein.

Referring to FIG. 6, and as mentioned, an implicit probability model may be used and may be a many-to-many probability density function model such as an example simplified hidden Markov model (HMM) 600. The HMM 600 has observation states 602-1 to 602-G, hidden states 604-1 to 604-G, transition probabilities Tr 606-(G−1) and Tr 608-(G−1), and emission probabilities E 610-1 to E 610-G, as shown. For this HMM model, each hidden state has multiple emission probabilities with each emission probability to lead to each of the observation states (similar to a fully connected neural network layer). As described, each hidden state is a default parameter configuration of scenes in a trajectory or storyline, and each observation state is a current parameter configuration that represents the user behavior.

The emission probabilities are the likelihood that a certain default parameter configuration is the same as one of the current parameter configurations, and the transition probabilities are the likelihood that a certain parameter configuration is subsequent to a previous default parameter configuration, and the static likelihood that a user moves into that scene. When the transition probability indicates movement from a default parameter configuration of one scene to a default parameter configuration in another scene, this indicates the probabilities of the scene order itself, which can be used for automatic selection of scenes for one of the available alternative storylines. In other words, the direction and connections (or edges) of the transition probabilities between the hidden states limits the HMM to the available predetermined alternative storylines of the narrative graph being followed by the story.

Thus, the hidden states define all possible paths associating a degree of likelihood as a priori knowledge of the execution. Within those available paths (or experience trajectories), and even if an edge in the transition graph has a low probability, the user still may take that specific path, and by taking an unlikely path, the information provided about the user by taking the unlikely path is very informative. This may be noticed on the associated probability on each of the hidden paths. Thus, while the edges between the hidden states and scenes may limit the alternative subsequent hidden states and scenes by having connections with a probability of zero, it still does not limit the path the user may take at any time within non-zero edges. Other details are provided below.

Process 300 may include "input the user behavior data to the probability model" 316 as one example, but more generally, input to the user observation input unit 120 (FIG. 1) whether or not the unit is considered part of the probability model or not. The composed hidden state trajectories $Z_u$ are not directly observable on the system nor in the scene navigation selections of the user, but indirectly via the observations of user actions and preferences during the steering of the experience, namely as the user acts and varies position, orientation, and/or desires or causes other aesthetic image parameter variations. Accordingly, the most current sensor data and the user selected image parameters cooperatively form the user behavior and are obtained as described above to form a vector of a current parameter configuration.

Thus, process 300 may include "determine current image parameter configuration using the behavior data" 318. This operation may involve converting the raw sensor data into image parameters if such conversion is needed, and placing the parameters in the correct order in a vector of the parameters for the current parameter configuration of a scene that represents the behavior of the user. For example, sensor data providing XYZ or YPR 3D spatial coordinates and orientation of the pose of a person's face or eye gaze may be converted into camera view coordinates and orientation when such conversion is needed to obtain different units or coordinate systems for a camera or image field of view. Otherwise, user selected image parameters, such as color, contrast, hue, brightness, and so forth may have a color or luminance channel provided in typical 8 bit values of 0 to 255 and be listed with this value in the current parameter configuration vector. When desired, however, the image data may be converted to a scale of 0 to 1 for example so that all parameters in the vector are within the same range of values. This may be performed for individual frames of a video sequence or for each, or individual, refresh for example. The current parameter configuration is designated as $\psi_j$ for the probability equations below.

Process 300 may include "determine HMM emission probabilities" 320. Particularly, and as mentioned above, the HMM hidden states are each a default parameter configuration and each scene may have one or more, and by the example of graph 500, three different configurations or hidden states that share the same scene content but vary in their modulation schema (or default parameter configuration values). Thus, in a given hyper-probabilistic media product (as analogy to a film), each scene has multiple possible default parameter configurations which can be understood as execution paths (see paths 514 and 516 on graph 500).

With this HMM structure in mind, the emission probabilities are the likelihood of observing a default parameter (or rendering) configuration on a hidden state of a storyline where the default parameter configuration may be denoted by the vector $\psi_i \in R^n$ where n real values (R) are the different image parameters that form the default parameter configuration $\psi_i$ and as mentioned above regarding sensed camera position, orientation, and/or motion, selected image parameters, objects to be the in the images, and so forth. This may be denoted as $E_u(\psi_i) = P(\psi_i | Z_u)$. Notice that the freedom to navigate among the default parameter configurations implies that $E_u(\psi_i)$ is a many to many function, and therefore that the probability model is a probability density function (PDF) instead of a probability mass function (PMF) where the scene selections are discrete user decisions.

This operation may include "determine distance values between current configuration and default configurations of the scene" 322. Specifically, the evaluation of the instantaneous emission probability $E_u(\psi_i)$ uses the predefined HMM PDF structure as a scaffolding. Namely, the emission probability establishes a similarity (or closeness or difference) between a current (or instantaneous) setting or configuration $\psi_j$ that represents user behavior, and 1 existing possible default parameter configurations $\psi_i$ in a single current scene. Referring again to FIG. 5, these differences between the current and default parameter configurations can be explained visually assuming graph 500 also provides a representation of a parametric space. Say a current parameter configuration C 518 (or designated as $\psi_j$ in equation (1) below) represents a vector as described above and represents user behavior at a time to generate a scene image for scene 0 (502). A parametric distance $\Omega$ is the distance between current parameter configuration C 518 on scene 0 502 and each of the default parameter configurations $S_{0,0}$, $S_{1,0}$, and $S_{2,0}$ on the scene 0 (502). The emission probability $E_u(\psi_i)$ of each distance indicates the size of the distance and how close the current parameter configuration C (or $\psi_j$) 518 is to the individual default parameter configurations $S_{0,0}$, $S_{1,0}$, and $S_{2,0}$. The shortest distance, and in turn the highest emission probability indicates which default parameter configuration $S_{0,0}$, $S_{1,0}$, and $S_{2,0}$ should be used to generate the final visual image parameter configuration for a scene image to display to a user. It will be appreciated that, as mentioned above, the current parameter configuration C (or $\psi_j$) may represent behavior of one person or a social collection of behavior of a group of people (such as most popular image parameter selections or average position, gesture, and so forth) so that the distances represent a group of people rather than a single user. The following is the distance equation to obtain the metric or distance (or similarity index) $\Omega()$, namely:

$$\Omega(\psi_j, \psi_i, \Sigma) = [\psi_j - \psi_i]^T \cdot \Sigma \cdot [\psi_j - \psi_i] \quad (1)$$

where the equation generates a distance value $\Omega$ of a comparison between a current parameter configurations and one of the default parameter configurations of a scene. This is repeated for each default parameter configuration of the current scene. By an alternative form, it is possible that the computation is repeated just for important or key default parameter configurations in a scene rather than all of them; so, for example, 1-2 configurations for a scene may be key scenes that are analyzed when the scene has 3-5 default parameter configurations total.

As to the example distance equation (1) itself, distance $\Omega$ may be computed in normalization form as the dot product of (a) the difference between a default and current parameter configuration, (b) a scaling matrix $\Sigma$, and a (c) transpose of the difference. This is performed for each key default parameter configuration as mentioned and may be performed for every refresh of the image data, which occurs before rendering each frame by one example.

Accordingly, this operation may include "scale distance values" 324, where by one form, sigma is a scaling matrix $\Sigma^{dim(\psi j)2}$ that only has non-zero elements along the trace (diagonal) of the matrix, and which scales the displacement, rotation, and other parameter values in the parameter configurations $\psi_i$ and $\psi_j$ to avoid over emphasis (or undue influence) of large 3D displacements such as translation compared to subtle value variations such as focal length, and so on.

The distances (or deviations) $\Omega$ computed by equation (1) are not bounded and are not yet in probability form. However, by placing a distance $\Omega$ into a statistical kernel such as a Gaussian function (although others can be used such as triangular that uses an integral of one and is symmetric, and so forth), this can provide an ideal density model to convert the distance into a probability by using normalization. Accordingly, by one form of normalization, this operation may include "determine probability as proportion of distance to sum of the distances of the scene" 326. In other words, based on the distance metric, the process 300 can use a normalization function to convert the distance $\Omega$ (or similarity index) into a PDF via:

$$\xi_i = \Sigma_{l=1}^{l} e^{-\Omega(\psi_j, \psi_i, \Sigma)} \quad (2)$$

where l is in the set of L configuration definitions within a current scene and such that instantaneous emission probability is fully defined (over the known structure in a single scene) as:

$$E_u(\psi_i) = \frac{1}{\xi_i} e^{-\Omega(\psi_j, \psi_i, \Sigma)} \quad (3)$$

The result should be probability values from 0 to 1 due to the scaling. The emission probabilities $E_u(\psi_i)$ between the current parameter configuration and the default parameter configurations are used to steer the changes of the appearance of a current scene. Thus, the closer the user is to the most probable configuration, the less variation will be produced by another configuration (attractor) $\psi_a \notin Z_u$ in the nodes (or scenes) of the narrative graph.

The metric of $E_u$ also can be arranged to incorporate the social network of the user sharing the meta-experience distribution in form of crowd sourced plots over the hyper-probability interactive media flow as mentioned, such that the emission probability provides probabilities for social or group trajectory image appearances, which may be designated as trajectory $Z_\beta$.

When the automatic personalization parameters mode is activated but the personalized scene selection mode is deactivated, process 300 skips to operation 340 to determine the parameters to use to generate the scene image of the current scene based on the default parameter configuration with the highest emission probability. When the personalized scene selection is activated, however, process 300 then uses the emission probabilities in a joint probability equation as follows.

This emission probability algorithm obtains parameter configuration measurements from the hidden states in the HMM to determine image appearance that does not require disruptive user image parameter appearance selection during the running of the story application. This may be considered a continuous navigation-free mode, where navigation refers to travel between parameter configurations, for the user for both AR and VR, or when using other interfaces such as cameras, handheld controllers, and so forth. Due to this structure, the instantaneous joint probability of each hidden state can be estimated as follows.

Process 300 may include "obtain transition HMM probabilities" 328. As mentioned, the transition probabilities are the likelihoods of moving from one default parameter configuration to another as shown by the paths or trajectories 514 and 516 (FIG. 5). Both the default parameter configurations and the transition probabilities may be fixed and predetermined by the story developer, and therefore may be obtained from memory or transmission from a remote location providing the story application. The transition probabilities may be set to guide the user toward certain key or emphasized scenes and default user configurations. Thus, the higher the transition probability, the more likely a certain default parameter configuration will be chosen next.

By one form used herein, a start, initial, or first default parameter configuration is assigned to each scene with more than one default parameter configuration. Scenes with only a single default parameter configuration also is designated a first or initial default parameter configuration. This first default parameter configuration in each scene is automatically the first chosen configuration for that scene. Thus, the emission probability for these first default parameter configurations is always one as mentioned below. The following transition probabilities then can be fixed by the story developer as mentioned, or could be dynamic and change with certain limitations and over time via social media criteria (most popular scenes) or other due to other interactions, for example. At a minimum, for each default parameter configuration the sum of all transition probabilities out of the state or default parameter configuration is one. This does not apply to the incoming probabilities, which allow for rendering default parameter configurations less common but still interesting in terms of storytelling.

The transition probability may be formed as a stochastic transition matrix $T(q, r) = P(q|r)$ where each element in the matrix is a probability to move from one hidden state r to another hidden state q. Notice that q and r are in the set of all S: $= S_{f,w}$ designated by the story developer. Thus, a transition probability matrix is a matrix of all transition probabilities representing the probability of moving from default parameter configuration r to default parameter configuration q, some of which will result in movement from one scene to another scene when the default parameter configurations are on different scenes.

Process 300 may include "determine which scene is to be the current scene of the story" 330. For this operation, a joint probability equation is used 332 that determines a probability that a trajectory of scenes, and in turn, an order of default parameter configurations within those scenes, is a current trajectory. This inherently and automatically selects the current scene to be displayed when there are a number of optional scenes as well as which default parameter configuration is to be used to set the parameters of a resulting personalized scene image for the current scene. To accomplish this, process 300 may include "analyze storyline trajectories, trajectory by trajectory" 334. Thus, the computation of the joint probability equation is repeated for each available trajectory and may be repeated for each new frame or refresh of a video sequence being generated to display the story to one or more users. The trajectory with the highest probability provides the selected scene and default parameter configuration. Thus, this is performed during run-time of the story in real-time (or near real-time) and without action by the user(s) to provide a significant immersive experience for the user(s) without disruptions for these selections. The joint probability equation is as follows:

$$P(\psi_0, \ldots, \psi_{n-1} | Z_0 \ldots, Z_{n-1}) = P(S_{0,0}) E_0(\psi_0) \Pi_{k=1}^{n-1} T(k, k+1) E_k(\psi_k) \quad (4)$$

where k=1 to n−1 is a count of both the number of prior hidden states (or default parameter configurations $S_{f,w}$) in a storyline trajectory $Z_n$ (also referred to herein as a state sequence) and the number of transitions. The count n of default parameter configurations (or hidden states) also may be referred to as a count of the "observations" of the probability equation (4) being integrated into an estimation of a hidden state (and should not be confused with observation states of the HMM model). Each of the trajectories (or paths or state sequences) Z on the left of the equation is identified as (0 to n−1) which is the same as the hidden state count mentioned above because each trajectory Z is a given prior trajectory up to and including a last hidden state (or default parameter configuration) of its designation. The joint probability equation then indicates the new trajectory $Z_n$.

Another way to state this is that the joint probability expresses the likelihood of having a sequence of rendering configurations given a sequence of hidden states. This describes the structure of the process, which will be actually exploited in the inference marginalized form of eq. (6) below which performs an inverse singular case namely, providing the probability of being in a particular hidden state. Given a trace of associated rendering states along that path, this reveals how likely it is that the user is following the path U given the latest observations and predefined configurations in $Z_n$.

Note that these observations usually may be limited to the number of predefined existing default parameter configurations $S_{f,w}$ (which also may be referred to as $\psi_{f,w}$ or $\psi_i$), but not always. In theory, the system may be able to track relatively long scene paths (or trajectories), and when the hidden states in the end-to-end paths (or trajectories), say $Z_a$ and $Z_b$ for example, have long overlapping sets of scenes and default parameter (rendering) states, the n value may depend on the paths and whether the paths overlap, and in turn the story developer that creates the paths.

To explain further, another way to describe the probability is to state that the joint probability equation (4) presents the probability of having a sequence of default parameter configurations from $\psi_0$ to $\psi_{(n-1)}$ with a total of n observations, and given prior trajectories (or state sequences) $Z_0$ to $Z_{n-1}$. This in turn inherently expresses the joint likelihood of having a current default parameter configuration $\psi_{n-1}$ while being at a hidden state with a trajectory $Z_{n-1}$. In other words, the left side of the joint probability is a probability of a given current default parameter configuration assuming a path along one of the trajectories ($Z_0$ to $Z_{n-1}$) (or sequences of states). This probability will be 0 if the transition matrix T on the right side of the joint probability equation does not enable a sequential path along any of the sequences $Z_0$, $Z_1$, ... $Z_{n-2}$, or $Z_n$ with n transitions. Thus, the joint probability equation (4) evaluates the trajectories to find a U index which provides a maximum probability among the probabilities of each trajectory, and considers the trajectory with the maximum value the controlling (or triggering) factor to indicate the current scene and default parameter (rendering) configuration at the end of a scene. For one example, a trajectory $Z_n$ may be as follows:

$$Z_0 := \{(S_{0,0} | \psi_{0,0}), (S_{1,0} | \psi_{1,0}), (S_{0,1} | \psi_{0,1})(S_{1,1} | \psi_{1,1}) \ldots (S_{0,5} | \psi_{0,5})\} \quad (5)$$

where := refers to "being set as", and where for default rendering configurations $S_{f,w}$ is as described above. It should be noted that the $S_{f,w}$ is merely a part of the hidden state position and trajectory order (or index) position for the default parameter configuration $\psi_{f,w}$ but otherwise both designations refer to the same state in the HMM (FIG. 6), narrative graph (FIG. 4), and scene close-up flow graph (FIG. 5).

Regarding the right side of the joint probability equation and the computation of the probability, the joint probability is at least partly based on (1) the transition probabilities, (2) the emission probabilities of a hidden state (or default parameter configuration) each with one of the transition probabilities, (3) a probability of an initial default parameter trajectory and the emission probability of the initial default parameter configuration at individual scenes in a single trajectory being analyzed. Each of these terms of the joint probability equation is explained as follows.

Process 300 may include "compute scene trajectory probability as product of weighted emission probabilities" 336. The product generated by the right side of the joint probability equation expresses the likelihood of a trajectory by using the stochastic transition probability matrix T in which each element of the matrix $0 \leq T(q, r) \leq 1$ is a floating point real number that is the probability of a specific transition between two default parameter configurations (or hidden states), where the matrix (which represents the stochastic structural story-telling graph as described above) $T(q,r) = P(q|r)$.

The product on the right side of the joint probability equation allows for a definition of the sliding index k (where k=1 to n−1) as described above, and here to iterate over the sub-indices $S_{f,w}$ of sequences or trajectories Z. As described above, the k index is not interpreted directly and is not used directly in the equation, but as the indices of default parameter configuration (or hidden state) order, namely where k=1 is index (0,0), and k=2 leads to (1,0), and so forth according to a particular trajectory order. With this arrangement then, the matrix element T(k, k+1) indicates the transition probability from state k to state k+1, but only according to the structure (or order) of a single trajectory Z being analyzed.

Process 300 may include "use transition probabilities as weights of emission probabilities" 338, and to adjust the emission probabilities. Specifically, the emission probability $0 \leq E_k(\psi_k) \leq 1$ indicates the probability of a default parameter configuration $\psi_k$ given the current parameters of both the instantaneous or current configuration $\psi_j$ that represents user behavior and the $\psi_k$ of a given default parameter configuration. Thus, the emission probability represents the probability that the default parameter configuration is similar to a current (user behavior-based) parameter configuration. When the transition probability is low, but the emission probability is high, the resulting probability (the emission probability adjusted by the transition probability) is still low.

In other words, in most cases, both need to be high with a likely transition and a likely observation (default parameter configuration) to implicitly or latently be placed in a path $Z_{0,n-1}$ passing over those transitions with such observations.

Another factor in the joint probability equation is the probability of the single initial (or first or start) hidden state (or initial default parameter (or rendering) configuration) alone, and the emission probability of the initial default parameter configuration. This applies to the initial default parameter configuration of each scene as assigned by the story developer. Thus, the joint probability $Z_u$ may be expressed as probability $P(S_{0,0})$ which is a probability of the use of the vector of the initial default parameter configuration $\psi_{0,w}$ only at the initial hidden state. Thus, this can be considered a single state trajectory. Also by one form, this probability as well as the emission probability $E_0 (\psi_0)$ always is one for the first $S_{0,w}$ of each individual scene (here being at $S_{0,0}$ . . . ) since this state must be used, in this example. Thus, the initial default parameter configuration $\psi_{0,w}$ of a scene is used for each scene before switching to a different default parameter configuration of the scene and in the trajectory or storyline order. The initial emission probability $E_0(\psi_0)$ of each scene $S_{0,w}$ with rendering configuration $\psi_{0,w}$ is set at one to provide a starting point of the hyper-probability media that is fixed and deterministic at the beginning of each scene. This is done to provide consistency in experience in the story telling including branching flow, switching from one scene to the next, and/or propagating through any other stage of the story while the point of view, content, and events are reproduced according to the selections and resulting plot of the graph narrative of the story. This is all achieved while also limiting the joint probability output in a fast and tractable manner with a limited maximal sequence length per scene.

Process 300 may include "determine scene parameter configuration" 340, and this may include "determine default parameter configuration by joint probability equation" 342. Thus, once each available trajectory Z has a joint probability, the scene selection and default parameter configuration selection of the trajectory with the highest joint probability $Z_u$ is used for the next frame or scene image.

Specifically, the joint probability equation, as a forward-backward algorithm, provides a run-time inference for navigation, rendering style, and scene triggering, which can be considered a dynamic probabilistic plan, and of the current state. Thus, the estimate of the probability of each hidden state, namely the association of the current and previous view settings and scene structure to the predefined state trajectory $Z_u$ can be expressed as:

$$P_{(Z_u|\psi_0, \ldots, \psi_{u-1})} \quad (6)$$

With this relationship, the triggering transition (including rendering style changes) of a next obtained scene may be determined via:

$$(\psi_h, Z_h) = \mathrm{argmax}\_u(P_{(Z_u|\psi_0, \ldots, \psi_{u-1})}) \quad (7)$$

where $\psi_h$ is a next scene parameter (or rendering) configuration (or is the default parameter rendering to be used to generate the final parameters as described below), and $Z_h$ is a next state storyline (or trace or state traversal). This generates the continuous and smooth navigation with style transfer based on the observations of the current and previous sequences of rendering configurations ($\psi_0, \ldots, \psi_{u-1}$). Due to the nature of the process, the flow between $Z_h$ is continuous, dynamic, and probabilistic, thereby generating unique and massive personalized experiences.

Process 300 may include "determine scene parameter configuration" 344. Whether or not the automatic personalized scene selection mode is deactivated, but the automatic personalized parameter configuration selection mode is activated, the parameter configuration can be determined as follows. Once the emission probabilities are determined as per operation 320, the default parameter configuration with the highest emission probability of a scene (or that selected by the use of the joint probability equation) may be used to set the visual (and audio) parameter configuration of the personalized scene image. This may include simply using the default parameter configuration of the highest probability or joint probability trajectory with the highest probability as the parameters of the personalized scene image or could be determined by interpolation between the parameters of the selected default parameter configuration and the current (behavior-based) parameter configuration. By one form, the interpolation may be an even contribution between the two configurations or weighted by the probability value of the default parameter configuration. By yet another alternative, the parameters may be weighted among all of the parameter configurations of a same scene either including or excluding the current parameter configuration. Also, a type of convex interpolation may be used between predefined configurations stored in the $S_{ab}$ within the current scene, interpolation via radial basis, or the like. Many variations are contemplated.

Process 300 may include "generate 2D personalized scene images by applying the parameters while projecting the 3D reconstructions to 2D image planes" 346. Here, the selected parameters (or visual or audio) image parameter configuration or modulation schema), based on the HMM output, are used to project a 2D image from the volumetric content (or the 3D reconstruction). The 3D reconstruction may or may not include all parameters, such as color and so forth, that are adjusted by the selected parameter configuration. By other examples, the selected parameter configuration includes, or is associated with, the image data to be adjusted and placed on the projection from sources separate from the 3D reconstruction, such as blur or transparency factors for example. All other story-related data that is data to be placed on the personalized scene image, or may be used to generate data to determine image data to be placed on the personalized image, when not already provided by the 3D reconstruction, may be obtained from memory and used. This generates the data or frame of the personalized scene image.

Process 300 may include "render the personalized scene images" 348, where the personalized scene image (or content) is encoded, transmitted, and decoded to a user display device if not already on, or accessible to, the display device, and then the personalized scene image is displayed to the user on a screen of a display device. This may be repeated for each frame or refresh of a video sequence being displayed to a user.

Referring now to FIG. 7, by one approach an example process 700 is a computer-implemented method of image processing for interactive storytelling with probability-based personalized views. In the illustrated implementation, process 700 may include one or more operations, functions or actions as illustrated by one or more of operations 702 to 718 numbered evenly. By way of non-limiting example, process 700 may be described herein with reference to example image processing systems 100 or 800 of FIGS. 1 and 8 respectively, and where relevant.

Process 700 may include "obtain story narrative graph of multiple storylines of user selectable scenes" 702. This involves analysis of a script of a story to determine the content of each scene and which scenes are to be filmed as well as determine the order of the scenes in each of the branching storylines to generate a digital narrative graph to control the branch flow in the story.

Process 700 may include "generate 3D constructions of previously recorded scenes" 704. Here, volumetric reconstruction of the different scenes (i.e., using a multi-camera dome for example) may be performed by filming each scene with desired actors or objects when necessary (live constructions). Multi-camera systems may be used, whether stereo or other multi-camera perspective combination algorithms, to generate 3D reconstructions or models of each scene and for each key time point along the storylines. Animated stories may be reconstructed in 3D as well on known digital platforms. This volumetric reconstruction will allow for different renderings of the same scene to fill the content of the different storylines without having to repeatedly film the same scene modifying the modulation schema (e.g., camera pose for rendering or other visual aspects). This also may involve capturing images of alternative cast or objects, without filming the entire scene, to be placed in or out of the scenes as desired by a user or determined automatically by the method herein. This operation also may include obtaining any other story image content that may be desired to be placed in the personalized scene images and that will not be provided by the 3D reconstructions.

Process 700 may include "determine prototypical default image parameter configurations of individual scenes" 706, where the developers of the story determine the most desired parameters to generate a desired experience in each scene, such as a certain mood, quality, and so forth. Thus, a list of desired parameter types is established such as that disclosed herein, and the list or vector is populated with desired parameter values to form a default parameter configuration with at least one for each scene. The list parameters is of a fixed dimensionality (or in other words, the class or type of parameters do not change), and at least for equations (1) to (3) above.

Process 700 may include "setup probability model" 708, and this may include "assign each configuration an HMM hidden state value" 710, where each default parameter configuration is assigned a hidden state in proper order according to the narrative graph and scene preferences with a desired initial default parameter configuration at a first hidden state of each scene Process 700 may include "assign individual HMM observation states user observable behavior" 712, and in other words, establish sensor data collection and conversion routines as well as user selectable image parameter interfaces for the users' selections. This in turn may involve establishing extractors to obtain the user selections and place them in current parameter configuration vectors at a timing of each frame or refresh that enables the generation of the personalized scene images in real-time or near real-time (where it appears to be real time to a user). By one form, the user behavior should be obtained at least at one second at 60 fps (so that noise or calibration artifacts of an HMD won't affect the result due to an outlier when HMDs are being used) and before the personalized scene image is displayed to the user.

Process 700 may include "setup run-time transition probability adjustment fields" 714. Here, the transition probabilities of the transition matrix may be predetermined by the story developer to emphasize certain scenes for example and as described above. These preferences may be entered into a story developer interface for example and saved in memory. Then during operation of the joint probability equation (4), the transition probabilities may be obtained from memory as needed.

Process 700 may include "setup run-time emission probability adjustment fields" 716, where any of the other probability model equations may be setup to obtain data from memory as needed as well as the real time use behavior data, and as described above to run the emission probability and joint probability equations.

Process 700 may include "provide probability model for run-time operation" 718, where the probability model then may be uploaded to a story application on user devices or kept on a remote device, such as a server communicating with the user devices over the internet to provide the probability model operation, and may provide other story-related operations.

It will be appreciated that the processes 200, 300, and 700 respectively explained with FIGS. 2-3 and 7 do not necessarily need to be performed in the order shown, nor with all of the operations shown. It will be understood that some operations may be skipped or performed in different orders.

Also, any one or more of the operations of FIGS. 2-3 and 7 may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more of the operations of the example processes herein in response to program code and/or instructions or instruction sets conveyed to the processor by one or more computer or machine-readable media. In general, a machine-readable medium may convey software in the form of program code and/or instructions or instruction sets that may cause any of the devices and/or systems to perform as described herein. The machine or computer readable media may be a non-transitory article or medium, such as a non-transitory computer readable medium, and may be used with any of the examples mentioned above or other examples except that it does not include a transitory signal per se. It does include those elements other than a signal per se that may hold data temporarily in a "transitory" fashion such as RAM and so forth.

As used in any implementation described herein, the term "module" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems discussed herein.

As used in any implementation described herein, the term "logic unit" refers to any combination of firmware logic and/or hardware logic configured to provide the functionality described herein. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the coding systems discussed herein. One of ordinary skill in the art will appreciate that operations performed by hardware and/or firmware may alternatively be implemented via software, which may be embodied as a software package, code and/or instruction set or instructions, and also appreciate that logic unit may also utilize a portion of software to implement its functionality.

As used in any implementation described herein, the term "component" may refer to a module or to a logic unit, as these terms are described above. Accordingly, the term "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

Figure 8:
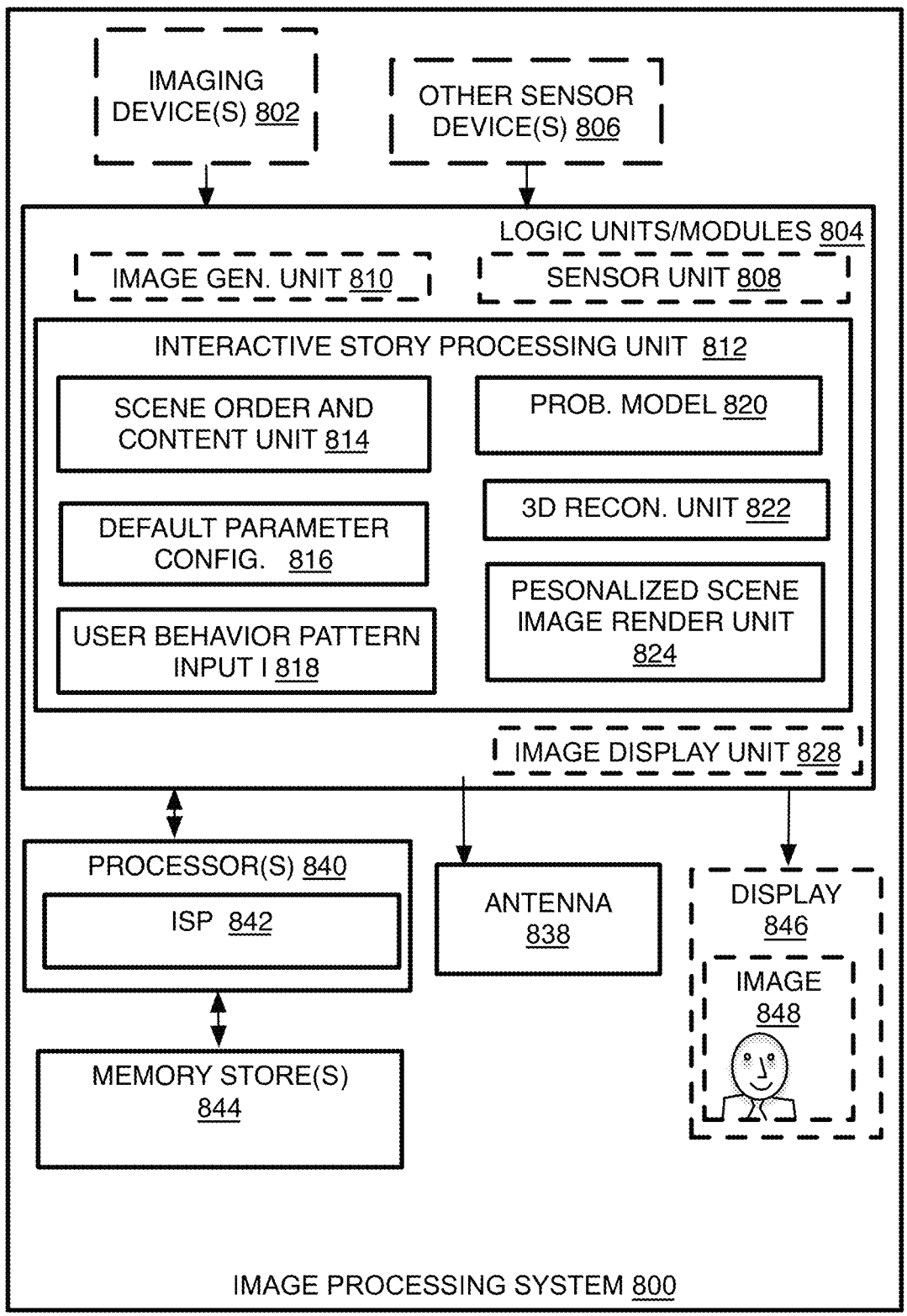
FIG. 8 is an illustrative diagram of an example system.

Referring to FIG. 8, an example image processing system 800 is arranged in accordance with at least some implementations of the present disclosure. In various implementations, the example image processing system 800 may perform the personalized scene image generation described above. Thus, system 800 may be, or have, a server, remote base of an HMD or mobile display device, game console, set-top box (cable box or satellite box) or other computing device remote from a display showing the interactive story and that generates the personalized scene images. Otherwise, system 800 may be, or have, a mobile device such as an HMD or another display such as a smart television or computer, and multiple users each may have their own device. Whether remote or local, the system 800 may have at least those units shown to receive story data, image data, user parameter preferences, and sensor data to operate a probability model as described herein. Thus, in addition to the HMD, television, or other display device, the system 800 may be a multi-function device such as a smartphone, smart glasses, tablet, laptop, and so forth.

The system 800 may locally or remotely include logic units or modules 804 that may perform the personalization operations for the interactive story. In this example case, the system 800 may obtain sensor data from imaging device(s) 802 or other sensor device(s) 806. Thus, the system 800 may communicate remotely with the sensors, such as with a camera, or the system 800 may be considered to have or be imaging device(s) 802 or one or more of the sensor devices 806.

In any of these cases, such technology may include a camera such as a digital camera system, a dedicated camera device, web cam, or any other device with a camera to be an external or internal still or video camera that may capture the user and the area around the user for example, or capture the environment surrounding an HMD when such a camera is on such a mobile device. The camera(s) may be an RGB camera or an RGB-D camera, but could be a YUV camera, monochrome camera, or an IR camera with a projector and sensor. Thus, in one form, image processing system 800 may include the imaging device(s) 802 and that has camera hardware, camera software, units, modules, components, and optics including one or more sensors as well as autofocus, zoom, aperture, neutral density (or ND) filter, auto-exposure, flash, actuator controls, and so forth. In other cases, the imaging device(s) 802 may be considered physically remote from the rest of the image processing system 800, and may be wirelessly communicating, or wired to communicate, image data to the logic units 804. In this form, logic modules 804 may communicate remotely with, or otherwise may be communicatively coupled to, the imaging device 802 for further processing of the image data.

The system 800 also may have other sensor device(s) 806 which may include those sensors at the display such as a mobile device HMD, HMD base, or other electronic device processing data to determine user behavior, or may be remote from any of these when the sensor is self-contained. Such sensors may include one or more gyroscopes, accelerometers, IMUs, GPSs, and optical projector systems whether IR, RGB, or other light technology, and so forth.

The logic modules 804 of the image processing system 800 may have a sensor unit 808 that receives sensor data from the sensors 806, which may or may not be raw sensor data, and may process the sensor data into a format expected for image processing and/or generation as well as placed in form of parameters for placement in current parameter configurations to be used for personalization operations. An image generation unit 810 may use the sensor data to process captured images to create a 3D model of the scenes, if not already predetermined and provided by the story developer, and to be used to project 2D images for display or to generate animated images. Thus, the image generation unit 810 may perform pre-processing, decoding, encoding, and/or even post-processing to prepare the image data for 2D projection, personalization operations, transmission, storage, and/or display.

In the illustrated example, the logic modules 804 also may include an interactive story processing unit 812 that has a scene order and content unit 814, a default parameter configuration unit 816, a user behavior pattern input unit 818, a probability model unit 820, a 3D reconstruction unit 822, and a personalized scene image render unit 824. The logic units 804 also may include an image display unit 828 that actually performs the rendering of the personalized images on a display screen, such as with display 846. These units may be used to personalize scene images and have similar functions as those units described above with similar titles, and to provide the personalization operations of processes 200, 300, or 700.

These units may be operated by, or even entirely or partially located at, one or more processor(s) 840, and which may include one or more CPUs or image signal processor (ISP) 842 to perform many of the operations mentioned herein. The processor(s) 840 may be an Intel Atom by one example. The system 800 also may have memory stores 844 which may be RAM, DRAM, DDR RAM, cache, or other memory types, and which may or may not hold the image data, story data, 3D reconstruction data, and parameter data as well as the logic units mentioned above. The system 800 also may have at least one antenna 838. The antenna may be used to transmit and/or receive sensor data, image data, parameter data, story data, overhead data, or other data. The sensors may use these antennas or may use other antennas to perform sensing operations.

In one example implementation, the image processing system 800 may have a display 846, which may or may not be one or more displays on an HMD or television, at least one of the processor(s) 840 communicatively coupled to the display, and at least one memory 844 communicatively coupled to the processor to perform the operations described herein as explained above. The image generation unit 810, which may have an encoder and decoder, and antenna 838 may be provided to transmit compressed image date to and from other devices that may display or store the images. This may refer to transmission of image data no matter which of the devices has the logic units 804. Otherwise, the processed image 848 may be displayed on the display 846 or stored in memory 844. As illustrated, any of these components may be capable of communication with one another and/or communication with portions of logic modules 804 and/or imaging device 802. Thus, processors 840 may be communicatively coupled to both the image device 802 and the logic modules 804 for operating those components. By one approach, although image processing system 800, as shown in FIG. 8, may include one particular set of unit or actions associated with particular components or modules, these units or actions may be associated with different components or modules than the particular component or module illustrated here.

Figure 9:
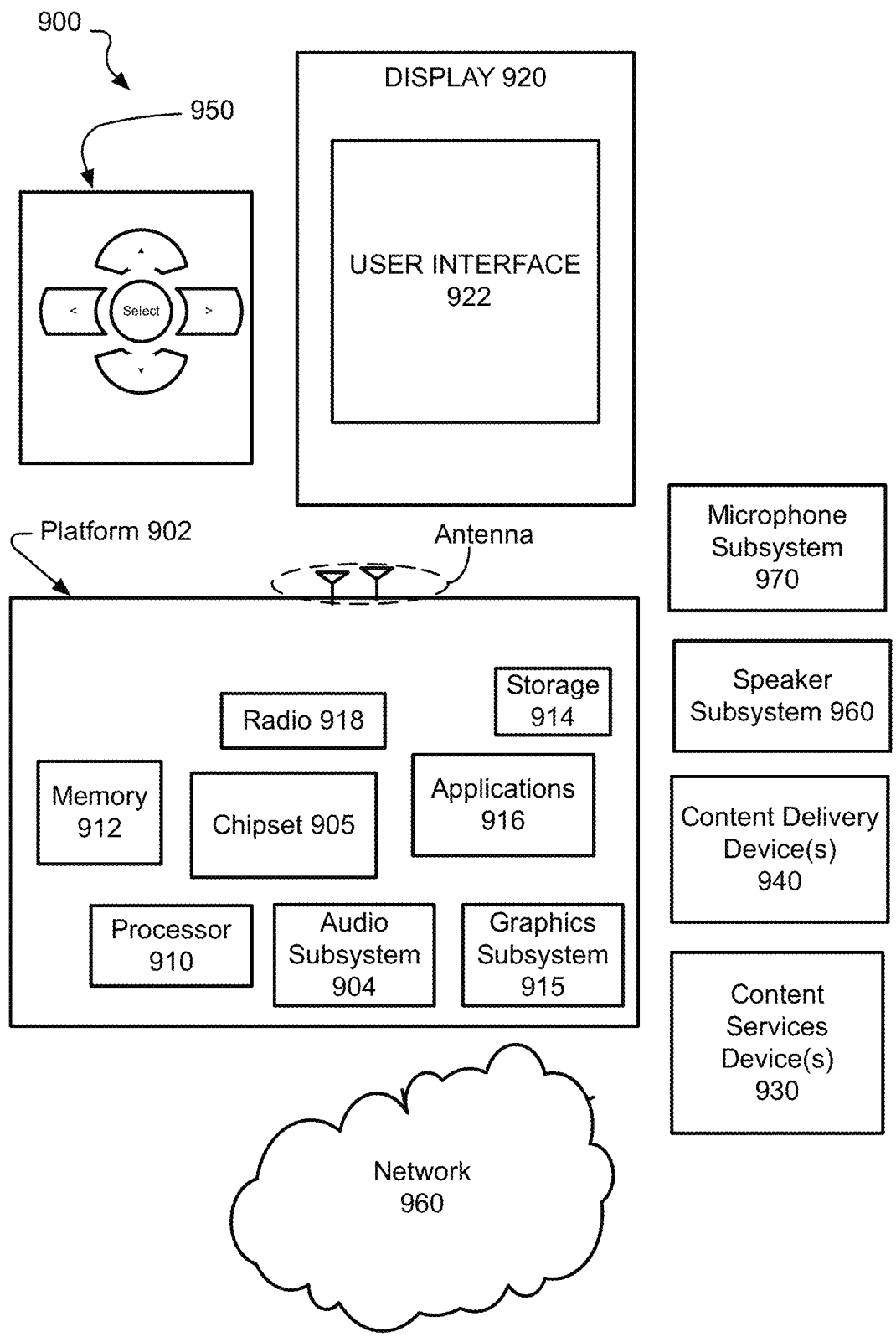
FIG. 9 is an illustrative diagram of another example system.

Referring to FIG. 9, an example system 900 in accordance with the present disclosure operates one or more aspects of the image processing system described herein. It will be understood from the nature of the system components described below that such components may be associated with, or used to operate, certain part or parts of the image processing systems described above including performance of a mobile device such as an HMD or other mobile device with a display for virtual or augmented reality generation for example, and/or operation of the base described above. In various implementations, system 900 may be a media system although system 900 is not limited to this context. For example, system 900 may be incorporated into a digital video camera, mobile device with camera or video functions such as an imaging phone, webcam, personal computer (PC), remote server, laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 900 includes a platform 902 coupled to a display 920. Platform 902 may receive content from a content device such as content services device(s) 930 or content delivery device(s) 940 or other similar content sources, audio data from a microphone subsystem 970 that receives sound or speech from a user. A speaker subsystem 960 emit sounds or speech to a user. A navigation controller 950 including one or more navigation features may be used to interact with, for example, platform 902 and/or display 920. These components are described in greater detail below.

In various implementations, platform 902 may include any combination of a chipset 905, processor 910, memory 912, storage 914, graphics subsystem 915, applications 916 and/or radio 918. Chipset 905 may provide intercommunication among processor 910, memory 912, storage 914, graphics subsystem 915, applications 916 and/or radio 918. For example, chipset 905 may include a storage adapter (not depicted) capable of providing intercommunication with storage 914.

Processor 910 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 910 may be dual-core processor(s), dual-core mobile processor(s), and so forth.

Memory 912 may be implemented as a volatile memory device such as, but not limited to, a Random Access Memory (RAM), Dynamic Random Access Memory (DRAM), or Static RAM (SRAM).

Storage 914 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 914 may include technology to increase the storage performance enhanced protection for valuable digital media when multiple hard drives are included, for example.

Graphics subsystem 915 may perform processing of images such as still or video for display. Graphics subsystem 915 may be a graphics processing unit (GPU) or a visual processing unit (VPU), for example. An analog or digital interface may be used to communicatively couple graphics subsystem 915 and display 920. For example, the interface may be any of a High-Definition Multimedia Interface, Display Port, wireless HDMI, and/or wireless HD compliant techniques. Graphics subsystem 915 may be integrated into processor 910 or chipset 905. In some implementations, graphics subsystem 915 may be a stand-alone card communicatively coupled to chipset 905.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further implementations, the functions may be implemented in a consumer electronics device.

Radio 918 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), personal area networks (PANs), cellular networks, and satellite networks. In communicating across such networks, radio 918 may operate in accordance with one or more applicable standards in any version, and may be operated in conjunction with the antenna described below.

In various implementations, display 920 may include any television type monitor or display. Display 920 may include, for example, a computer display screen, touch screen display, video monitor, television-like device, and/or a television. Display 920 may be digital and/or analog. The display 920 also may be a display on an HMD as described above. In various implementations, display 920 may be a holographic display. Also, display 920 may be a transparent surface that may receive a visual projection. Such projections may convey various forms of information, images, and/or objects. For example, such projections may be a visual overlay for a mobile augmented reality (MAR) application. Under the control of one or more software applications 916, platform 902 may display user interface 922 on display 920.

In various implementations, content services device(s) 930 may be hosted by any national, international and/or independent service and thus accessible to platform 902 via the Internet, for example. Content services device(s) 930 may be coupled to platform 902 and/or to display 920. Platform 902 and/or content services device(s) 930 may be coupled to a network 960 to communicate (e.g., send and/or receive) media information to and from network 960. Content delivery device(s) 940 also may be coupled to platform 902 and/or to display 920.

In various implementations, content services device(s) 930 may include a cable television box, personal computer, network, telephone, Internet enabled devices or appliance capable of delivering digital information and/or content, and any other similar device capable of unidirectionally or bidirectionally communicating content between content providers and platform 902 and/display 920, via network 960 or directly. It will be appreciated that the content may be communicated unidirectionally and/or bidirectionally to and from any one of the components in system 900 and a content provider via network 960. Examples of content may include any media information including, for example, video, music, medical and gaming information, and so forth.

Content services device(s) 930 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 902 may receive control signals from navigation controller 950 having one or more navigation features. The navigation features of controller 950 may be used to interact with user interface 922, for example. In implementations, navigation controller 950 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 950 may be replicated on a display (e.g., display 920) by movements of a pointer, cursor, focus ring, or other visual indicators displayed on the display. For example, under the control of software applications 916, the navigation features located on navigation controller 950 may be mapped to virtual navigation features displayed on user interface 922, for example. In implementations, controller 950 may not be a separate component but may be integrated into platform 902 and/or display 920. The present disclosure, however, is not limited to the elements or in the context shown or described herein.

In various implementations, drivers (not shown) may include technology to enable users to instantly turn on and off platform 902 like a television with the touch of a button after initial boot-up, when enabled, for example. Program logic may allow platform 902 to stream content to media adaptors or other content services device(s) 930 or content delivery device(s) 940 even when the platform is turned "off." In addition, chipset 905 may include hardware and/or software support for 8.1 surround sound audio and/or high definition (7.1) surround sound audio, for example. Drivers may include a graphics driver for integrated graphics platforms. In implementations, the graphics driver may comprise a peripheral component interconnect (PCI) Express graphics card.

In various implementations, any one or more of the components shown in system 900 may be integrated. For example, platform 902 and content services device(s) 930 may be integrated, or platform 902 and content delivery device(s) 940 may be integrated, or platform 902, content services device(s) 930, and content delivery device(s) 940 may be integrated, for example. In various implementations, platform 902 and display 920 may be an integrated unit. Display 920 and content service device(s) 930 may be integrated, or display 920 and content delivery device(s) 940 may be integrated, for example. These examples are not meant to limit the present disclosure.

In various implementations, system 900 may be implemented as a wireless system, but also may include wired systems. When implemented as a wireless system, system 900 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 900 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 902 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 9.

Figure 10:
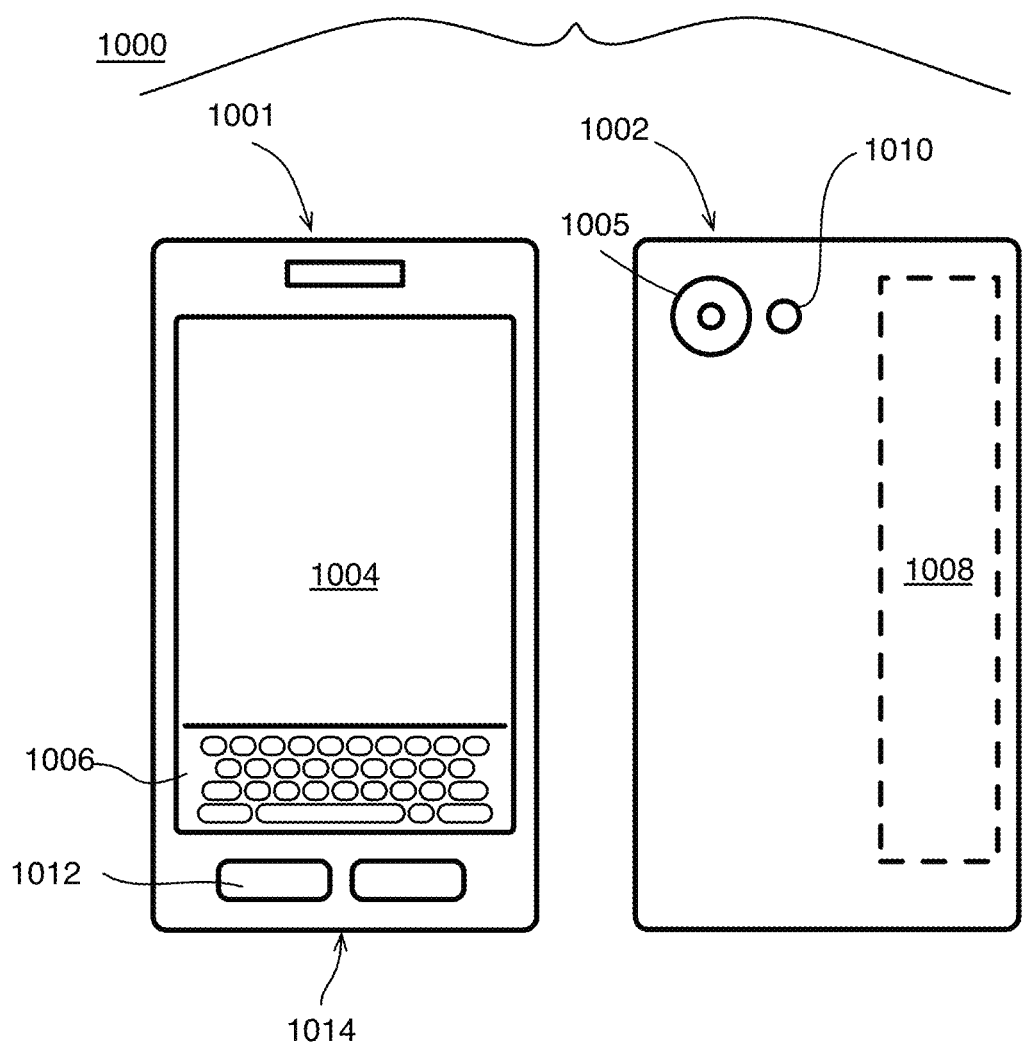
FIG. 10 illustrates another example device, all arranged in accordance with at least some implementations of the present disclosure.

Referring to FIG. 10, a small form factor device 1000 is one example of the varying physical styles or form factors in which systems 800 or 900 may be embodied. By this approach, device 1000 may be implemented as a mobile computing device having wireless capabilities, and by one example, could be used as a screen in an HMD. A mobile computing device may refer to any device having a processing system and a mobile power source or supply, such as one or more batteries, for example.

As described above, examples of a mobile computing device may include an a CR or AR HMD, as well as a digital still camera, digital video camera, mobile devices with camera or video functions such as imaging phones, webcam, personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The implementations are not limited in this context.

As shown in FIG. 10, device 1000 may include a housing with a front 1001 and a back 1002. Device 1000 includes a display 1004, an input/output (I/O) device 1006, and an integrated antenna 1008. Device 1000 also may include navigation features 1012. I/O device 1006 may include any suitable I/O device for entering information into a mobile computing device. Examples for I/O device 1006 may include an alphanumeric keyboard, a numeric keypad, a touch pad, input keys, buttons, switches, microphones, speakers, voice recognition device and software, and so forth. Information also may be entered into device 1000 by way of microphone 1014, or may be digitized by a voice recognition device. As shown, device 1000 may include a camera 1005 (e.g., including at least one lens, aperture, and imaging sensor) and a flash 1010 integrated into back 1002 (or elsewhere) of device 1000. The implementations are not limited in this context.

Various forms of the devices and processes described herein may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further implementations.

By an example one or more first implementations, a computer-implemented method of image processing comprises obtaining behavioral input of at least one user viewing multiple user selectable scenes of an interactive story; obtaining default image parameter configurations of the multiple scenes; generating image data of a scene to form a personalized scene image comprising running a probability model that at least partly depends on the behavioral input and the default image parameter configurations; and providing the personalized scene image to display to at least one user.

By one or more second implementations, and further to the first implementation, the method comprises obtaining 3D reconstructions of the scenes; determining personalized image parameters of the scenes at least partly based on the probability model; and generating 2D projected images projected from the 3D reconstructions of the scenes to form the personalized scene images and by using the personalized image parameters.

By one or more third implementations, and further to the first or second implementation, wherein the probability model is a many-to-many probability density function model.

By one or more fourth implementations, and further to any of the first to third implementation, wherein the probability model is a hidden Markov model (HMM).

By one or more fifth implementations, and further to any of the first to fourth implementation, wherein the probability model is a hidden Markov model (HMM) that has observation states represented by the observable user behavior inputs convertible into current image parameter configurations.

By one or more sixth implementations, and further to any of the first to fifth implementation, wherein the probability model is an HMM that has hidden states each related to one of the default image parameter configurations of a current scene, wherein each scene has one or more hidden states each with a default image parameter configuration.

By one or more seventh implementations, and further to any of the first to fifth implementation, wherein the probability model is an HMM that has hidden states each related to one of the default image parameter configurations of a current scene, wherein each scene has one or more hidden states each with a default image parameter configuration, and wherein the HMM has an emission probability of a scene representing a greatest similarity between a current parameter configuration and one of the default image parameter configurations of the scene.

By one or more eighth implementations, and further to any of the first to fifth implementation, wherein the probability model is an HMM that has hidden states each related to one of the default image parameter configurations of a current scene, wherein each scene has one or more hidden states each with a default image parameter configuration, and wherein the HMM has an emission probability of a scene representing a greatest similarity between a current parameter configuration and one of the default image parameter configurations of the scene, and wherein the emission probability is related to a parametric space difference between (1) at least one of the default image parameter configurations of a scene, and (2) a current parameter configuration that represents the user behavioral input.

By one or more ninth implementations, and further to any of the first to fifth implementation, wherein the probability model is an HMM that has hidden states each related to one of the default image parameter configurations of a current scene, wherein the HMM has an emission probability of a scene representing a greatest similarity between a current parameter configuration and one of the default image parameter configurations of the scene, and wherein each scene has one or more hidden states each with a default image parameter configuration, and wherein the emission probability of a current scene is the emission probability that is the highest proportion of the emission difference over the sum of the emission differences of multiple default image parameter configurations of the current scene.

By one or more tenth implementations, and further to any of the first to fifth implementation, wherein the probability model is an HMM that has hidden states each related to one of the default image parameter configurations of a current scene, wherein each scene has one or more hidden states each with a default image parameter configuration, and wherein the HMM has an emission probability of a scene representing a greatest similarity between a current parameter configuration and one of the default image parameter configurations of the scene, and wherein the method comprises generating the personalized image parameters comprising at least one of: (1) interpolating parameters between parameters of a current parameter configuration representing the observed behavior of the user and a default image parameter configuration providing the emission probability of the current scene, and (2) using the parameters of the default image parameter configuration providing the emission probability of the current scene.

By one or more eleventh implementations, and further to any of the first to tenth implementation, wherein the probability model is an HMM with transition probabilities each being a probability that one default image parameter configuration is subsequent to another default image parameter configuration, wherein at least some of the transition probabilities represent a change in scenes; and the method comprising automatically selecting which scene is to be displayed next as a current scene after a previous scene at least partly based on emission probabilities of the HMM weighted by the transition probabilities.

By one or more twelfth implementations, an image processing device comprises memory; and at least one processor communicatively connected to the memory, the at least one processor being arranged to operate by: obtaining behavioral input of at least one user viewing multiple user selectable scenes of an interactive story during a run-time; obtaining default image parameter configurations of the multiple scenes and predetermined scene order data; automatically, during the run-time, selecting at least one current alternative scene without user input and generating image data parameters of the current scene to form a personalized scene image comprising operating a probability model that at least partly depends on the behavioral input, the default image parameter configurations, and the scene order data; and providing the personalized scene image to display to at least one user.

By an example thirteenth implementation, and further to the twelfth implementation, wherein the probability model is a hidden Markov model (HMM) with transition probabilities wherein at least some of the transition probabilities indicate whether one scene is subsequent to another scene and being available according to multiple alternative possible scene order combinations forming alternative storylines of the predetermined scene order data.

By one or more fourteenth implementations, and further to the twelfth implementation, wherein the probability model is a hidden Markov model (HMM) with transition probabilities wherein at least some of the transition probabilities indicate whether one scene is subsequent to another scene and being available according to multiple alternative possible scene order combinations forming alternative storylines of the predetermined scene order data, and wherein the transition probabilities are fixed and pre-determined before the run-time.

By one or more fifteenth implementations, and further to the twelfth implementation, wherein the probability model is a hidden Markov model (HMM) with transition probabilities wherein at least some of the transition probabilities indicate whether one scene is subsequent to another scene and being available according to multiple alternative possible scene order combinations forming alternative storylines of the predetermined scene order data, and wherein automatically selecting the current scene comprises weighting emission probabilities of the HMM by the transition probabilities.

By one or more sixteenth implementations, an image processing system comprises memory; and at least one processor communicatively connected to the memory, the at least one processor being arranged to operate by: obtaining behavioral input of at least one user viewing multiple user selectable scenes of an interactive story; obtaining default image parameter configurations of the multiple scenes and predetermined scene order data; automatically selecting the order of the scenes without user input while the user is viewing the interactive story and generating image data of a scene to form a personalized scene image comprising operating a probability model that at least partly depends on the behavioral input, the default image parameter configurations, and the scene order data; and providing the personalized scene image to display to at least one user.

By one or more seventeenth implementations, and further to the sixteenth implementation, wherein the probability model is operated by using a joint probability equation that indicates both which scene is a current scene to be viewed next and which default image parameter configuration is to be used to form the personalized scene image.

By one or more eighteenth implementations, and further to the sixteenth implementation, wherein the probability model is operated by using a joint probability equation that indicates both which scene is a current scene to be viewed next and which default image parameter configuration is to be used to form the personalized scene image, and wherein the joint probability model provides a probability of one of the available trajectories, each trajectory having default parameter configurations within scenes of the trajectory.

By one or more nineteenth implementations, and further to the sixteenth implementation, wherein the probability model is operated by using a joint probability equation that indicates both which scene is a current scene to be viewed next and which default image parameter configuration is to be used to form the personalized scene image, and wherein selecting of the order of the scenes comprises selecting a current scene depending on previous scene selections factoring representations of the behavioral input of the at least one user.

By one or more twentieth implementations, and further to the sixteenth implementation, wherein the probability model is operated by using a joint probability equation that indicates both which scene is a current scene to be viewed next and which default image parameter configuration is to be used to form the personalized scene image, and wherein the joint probability equation factors a first default parameter configuration of multiple scenes in a trajectory of scenes being analyzed, and wherein the emission probability of the first default configuration of the scenes in the trajectory is one.

By one or more twenty-first implementations, at least one non-transitory computer readable medium comprising a plurality of instructions that when executed cause a computing device to operate by: obtaining behavioral input of at least one user viewing multiple user selectable scenes of an interactive story; obtaining default image parameter configurations of the multiple scenes and predetermined scene order data; selecting the order of the scenes and changing image data of a scene to form a personalized scene image at least partly depending on a probability model that uses the behavioral input, the default image parameter configurations, and the scene order data; and providing the personalized scene image to display to at least one user.

By one or more twenty-second implementations, and further to the twenty-first implementation, wherein the probability model automatically determines selection of a current scene comprising finding the maximum probability of the available scenes at least partly based on a first default image parameter configuration of each scene, a hidden Markov model (HMM) emission probability of the first configuration, transition probabilities between current and previous default image parameter configurations that each form a hidden state of the HMM, and HMM emission probabilities of the default image parameter configurations.

By one or more twenty-third implementations, and further to the twenty-first or twenty-second implementation, wherein the instructions cause the computing device to operate by providing alternative modes to view the interactive story comprising at least one of: (1) an option mode that provides the user an option to alternatively view the personalized scene image or a scene image with different parameters than that of the personalized scene image, and (2) an option mode that provides the user an option to alternatively view an automatically selected next scene and the user's manual selection of the next scene.

By one or more twenty-fourth implementations, and further to any of the twenty-first to twenty-third implementation, wherein the behavioral input relates to at least one of: speech, facial position, gaze direction, body position, proximity to objects in a scene, direction of motion of the user, speed of motion of the user, and speech of the user, focal distance, type of lighting, brightness, color, contrast, hue, blur, transparency, lens distortion, cast in the scene, and environment or objects on the scene.

By one or more twenty-fifth implementations, and further to any of the twenty-first to twenty-fourth implementation, wherein the image parameters is at least one of: image camera pose position, image camera pose orientation, focal distance, type of lighting, brightness, color, contrast, hue, blur, transparency, lens distortion, cast in the scene, and environment or objects on the scene.

In one or more twenty-sixth implementations, a device or system includes a memory and a processor to perform a method according to any one of the above implementations.

In one or more twenty-seventh implementations, at least one machine readable medium includes a plurality of instructions that in response to being executed on a computing device, cause the computing device to perform a method according to any one of the above implementations.

In one or more twenty-eighth implementations, an apparatus may include means for performing a method according to any one of the above implementations.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to any example methods herein may be implemented with respect to any example apparatus, example systems, and/or example articles, and vice versa.

What is claimed is:

1. A computer-implemented method of image processing, the method comprising:
    obtaining behavioral input of at least one user viewing an interactive story;
    obtaining default image parameter configurations of scenes of the interactive story;
    obtaining three-dimensional (3D) reconstructions of the scenes;
    determining personalized image parameters of the scenes at least partly based on a probability model that at least partly depends on the behavioral input and the default image parameter configurations;
    generating two-dimensional (2D) images based on the personalized image parameters to form personalized scene images, the 2D images projected from the 3D reconstructions of the scenes; and
    providing the personalized scene images to a display.

2. The method of claim 1, wherein the probability model is based on a many-to-many probability density function model.

3. The method of claim 1, wherein the probability model is based on a hidden Markov model (HMM).

4. The method of claim 1, wherein the probability model is based on an HMM that has observation states represented by observable user behavior inputs that are convertible into current image parameter configurations.

5. The method of claim 1, wherein a current scene is associated with at least one of the default image parameter configurations, and the probability model is based on an HMM that has one or more hidden states related to the at least one of the default image parameter configurations associated with the current scene.

6. The method of claim 5, wherein the HMM has an emission probability representing a similarity between a current parameter configuration and the at least one of the default image parameter configurations associated with the current scene.

7. The method of claim 6, wherein the emission probability is related to a parametric space difference between (1) the at least one of the default image parameter configurations associated with the current scene, and (2) a current parameter configuration that represents the behavioral input.

8. The method of claim 6, wherein the emission probability of the current scene is based on a sum of emission differences of multiple default image parameter configurations of the current scene.

9. The method of claim 6, wherein the generating of the personalized image parameters is based on at least one of:
    (1) interpolating between parameters of a current parameter configuration representing the behavioral input and parameters of the default image parameter configuration providing the emission probability of the current scene, or (2) the parameters of the default image parameter configuration providing the emission probability of the current scene.

10. The method of claim 1, wherein the probability model is based on an HMM with transition probabilities that ones of the default image parameter is configurations are subsequent to other ones of the default image parameter configurations, at least some of the transition probabilities represent a change in scenes, and including automatically selecting which scene is to be displayed next as a current scene after a previous scene at least partly based on emission probabilities of the HMM that are weighted based on the transition probabilities.

11. An image processing device comprising:
memory;
computer readable instructions; and
at least one processor circuit to be programmed based on the computer readable instructions to:
 obtain behavioral input of at least one user viewing an interactive story during a run-time;
 obtain default image parameter configurations of the scenes of the interactive story and scene order data;
 during the run-time, select at least one current alternative scene without user input and generate image data parameters of the at least one current alternative scene to form a personalized scene image, selection of the at least one current alternative scene and generation of the image data parameters based on a probability model that at least partly depends on the behavioral input, the default image parameter configurations, and the scene order data, the probability model based on a hidden Markov model (HMM) with transition probabilities, at least some of the transition probabilities to indicate whether one scene is subsequent to another scene and is available according to multiple alternative possible scene order combinations forming alternative storylines of the scene order data; and
 provide the personalized scene image to a display.

12. The device of claim 11, wherein the transition probabilities are fixed and pre-determined before the run-time.

13. The device of claim 11, wherein the selection of the current alternative scene is based on emission probabilities of the HMM weighted based on the transition probabilities.

14. An image processing system comprising:
memory;
computer readable instructions; and
at least one processor circuit to be programmed based on the computer readable instructions to:
 obtain behavioral input of at least one user viewing an interactive story;
 obtain default image parameter configurations of multiple scenes of the interactive story and scene order data;
 select an order of the scenes without user input while the user is viewing the interactive story and generate image data of a scene to form a personalized scene image, one or more of the at least one processor circuitry to select the order of the scenes and generate the image data of the scene based on a probability model that at least partly depends on the behavioral input, the default image parameter configurations, and the scene order data, the probability model based on a joint probability equation that indicates both which scene is a current scene to be viewed next and which default image parameter configuration is to be used to form the personalized scene image; and
 provide the personalized scene image for presentation on a display.

15. The system of claim 14, wherein the joint probability equation provides a probability of one of a plurality of available trajectories, respective ones of the trajectories having default parameter configurations associated with scenes of the corresponding trajectory.

16. The system of claim 14, wherein one or more of the at least one processor circuit is to select the order of the scenes based on previous scene selections and representations of the behavioral input of the at least one user.

17. The system of claim 14, wherein the joint probability equation is based on a first default parameter configuration of multiple scenes in a trajectory of scenes being analyzed, and an emission probability of the first default parameter configuration of the scenes in the trajectory is one.

18. At least one non-transitory computer readable medium comprising a plurality of instructions to cause a computing device to at least:
 obtain behavioral input of at least one user viewing an interactive story;
 obtain default image parameter configurations of scenes of the interactive story and scene order data;
 select an order of the scenes and change image data of a scene to form a personalized scene image based at least partly on a probability model, the probability model based on the behavioral input, the default image parameter configurations, and the scene order data, the personalized scene image based on a current scene associated with a largest probability of available scenes determined based on respective first default image parameter configurations of the available scenes, hidden Markov model (HMM) emission probabilities of the respective first configurations, transition probabilities between current and previous default image parameter configurations that form hidden states of the HMM, and HMM emission probabilities of the default image parameter configurations; and
 provide the personalized scene image to a display.

19. The medium of claim 18, wherein the instructions are to cause the computing device to at least one of:
(1) provide the at least one user an option to alternatively view the personalized scene image or a scene image with different parameters than that of the personalized scene image, or
(2) provide the at least one user an option to alternatively view an automatically selected next scene and a manual selection of the next scene.

20. The medium of claim 18, wherein the behavioral input relates to at least one of: speech, facial position, gaze direction, body position, proximity to objects in a scene, direction of motion of the at least one user, speed of motion of the at least one user, speech of the at least one user, focal distance, type of lighting, brightness, color, contrast, hue, blur, transparency, lens distortion, cast in the scene, or environment or objects in the scene.

21. The medium of claim 18, wherein the image parameters of the default image parameter configurations include at least one of: image camera pose position, image camera pose orientation, focal distance, type of lighting, brightness, color, contrast, hue, blur, transparency, lens distortion, cast in the scene, or environment or objects in the scene.

* * * * *

UNITED STATES PATENT AND TRADEMARK OFFICE
CERTIFICATE OF CORRECTION

PATENT NO. : 12,236,003 B2
APPLICATION NO. : 17/172878
DATED : February 25, 2025
INVENTOR(S) : Brugarolas Brufau et al.

Page 1 of 1

It is certified that error appears in the above-identified patent and that said Letters Patent is hereby corrected as shown below:

In the Claims

Column 39, Line 9 (Claim 10), replace "parameter is configurations" with --parameter configurations--

Column 39, Lines 24-25 (Claim 11), replace "of the scenes" with --of scenes--

Column 39, Lines 55-56 (Claim 14), replace "of multiple scenes" with --of scenes--

Signed and Sealed this
Twenty-ninth Day of April, 2025

Coke Morgan Stewart
*Acting Director of the United States Patent and Trademark Office*